US009769424B2

(12) United States Patent
Michot

(10) Patent No.: US 9,769,424 B2
(45) Date of Patent: Sep. 19, 2017

(54) ARRANGEMENTS AND METHOD THEREOF FOR VIDEO RETARGETING FOR VIDEO CONFERENCING

(71) Applicant: Telefonaktiebolaget LM Ericsson (publ), Stockholm (SE)

(72) Inventor: Julien Michot, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/030,942

(22) PCT Filed: Oct. 24, 2013

(86) PCT No.: PCT/EP2013/072265
§ 371 (c)(1),
(2) Date: Apr. 21, 2016

(87) PCT Pub. No.: WO2015/058799
PCT Pub. Date: Apr. 30, 2015

(65) Prior Publication Data
US 2016/0277712 A1    Sep. 22, 2016

(51) Int. Cl.
| | |
|---|---|
| H04N 7/14 | (2006.01) |
| H04N 7/15 | (2006.01) |
| G06K 9/00 | (2006.01) |
| G06K 9/52 | (2006.01) |
| G06K 9/62 | (2006.01) |
| G06T 7/20 | (2017.01) |

(Continued)

(52) U.S. Cl.
CPC ........... *H04N 7/15* (2013.01); *G06K 9/00335* (2013.01); *G06K 9/52* (2013.01); *G06K 9/6267* (2013.01); *G06T 7/20* (2013.01); *G06T 7/60* (2013.01); *H04N 5/265* (2013.01); *H04N 7/142* (2013.01); *H04N 7/147* (2013.01); *G06K 2009/4666* (2013.01)

(58) Field of Classification Search
CPC ........................................................ H04N 7/14
USPC .......... 348/14.01, 14.03, 14.07, 14.16, 14.12
See application file for complete search history.

(56) References Cited

U.S. PATENT DOCUMENTS

| | | | |
|---|---|---|---|
| 6,192,342 B1 | 2/2001 | Akst | |
| 8,970,653 B2 * | 3/2015 | Bowen | H04N 7/15 |
| | | | 348/14.03 |

(Continued)

FOREIGN PATENT DOCUMENTS

| | | |
|---|---|---|
| EP | 2 566 194 | 3/2013 |
| WO | WO 2009070449 | 6/2009 |
| WO | WO 2010141023 | 12/2010 |

OTHER PUBLICATIONS

"A System for Retargeting of Streaming Video" by Philipp Krahenbuhl et al.; ACM Transactions on Graphics, vol. 28, No. 5, Article 126—Dec. 2009.

(Continued)

*Primary Examiner* — Olisa Anwah
(74) *Attorney, Agent, or Firm* — Baker Botts, LLP

(57) ABSTRACT

According to embodiments of the present invention, sound localization is used to determine the active speaker in a video conference. A network element uses the localization to determine which regions of the image that should be preserved and retargets the video accordingly. By providing a retargeted video where the speaker is more visible, a better user experience is achieved.

26 Claims, 22 Drawing Sheets

(51) Int. Cl.
    *G06T 7/60*        (2017.01)
    *H04N 5/265*    (2006.01)
    *G06K 9/46*      (2006.01)

(56) References Cited

U.S. PATENT DOCUMENTS

| | | | |
|---|---|---|---|
| 2008/0218582 A1* | 9/2008 | Buckler | H04N 7/15 |
| | | | 348/14.08 |
| 2009/0210789 A1 | 8/2009 | Thakkar et al. | |
| 2010/0085419 A1 | 4/2010 | Goyal et al. | |
| 2010/0245536 A1 | 9/2010 | Huitema et al. | |
| 2012/0026277 A1* | 2/2012 | Malzbender | H04N 7/15 |
| | | | 348/14.07 |
| 2012/0077172 A1 | 3/2012 | Watanabe et al. | |
| 2012/0200658 A1* | 8/2012 | Duckworth | H04N 7/152 |
| | | | 348/14.07 |
| 2013/0139193 A1 | 5/2013 | Fan et al. | |
| 2014/0049595 A1* | 2/2014 | Feng | H04N 7/15 |
| | | | 348/14.08 |
| 2014/0341280 A1* | 11/2014 | Yang | H04N 7/147 |
| | | | 375/240.08 |

OTHER PUBLICATIONS

International Search Report for International application No. PCT/EP2013/072265—May 22, 2014.

\* cited by examiner 1010, 1020

1010

1010

1010

ARRANGEMENTS AND METHOD THEREOF FOR VIDEO RETARGETING FOR VIDEO CONFERENCING

PRIORITY

This nonprovisional application is a U.S. National Stage Filing under 35 U.S.C. §371 of International Patent Application Serial. No. PCT/EP2013/072265, filed Oct. 24, 2013, and entitled "Arrangements And Method Thereof For Video Retargeting For Video Conferencing."

TECHNICAL FIELD

Embodiments of the present invention relate generally to video conferencing, and, more particularly, relate to a method, apparatus, and a computer program product for video retargeting that adapts video to better suit the target, e.g. a display, minimizing the important information lost, wherein sound localization is used to determine active speaker location and image regions that should be preserved.

BACKGROUND

A video conference is a communication session where participants can see and hear each other using video screens, microphones and cameras as schematically illustrated in FIG. 1. Examples of captured video in native format are illustrated in FIG. 2A and FIG. 2B.

When displaying participants in a video conference, participants often manually adjust camera viewing angles and camera zoom levels in order to capture one or more participants for the video conference. Some existing techniques try to automate this manual adjustment by using microphones and image receiver for scaling the image as illustrated in FIG. 3A and FIG. 3B, automatically and digitally cropping as illustrated in FIG. 4, or controlling a pan, tilt, zoom and focus settings of the camera to the active speaker. Such solutions are disclosed by e.g. patent documents U.S. Pat. No. 6,275,258B1, U.S. Pat. No. 6,469,732B1, and U.S. Pat. No. 8,314,829B2.

Patent documents U.S. Pat. No. 8,488,840B2 and WO2010141023A1 further discloses solutions for detecting and cropping the region(s) of interest from a video stream of the participant and arranging the cropped video stream of the participant with additional cropped video streams of additional participants for display in the video conference. An example of such arrangement is given in FIG. 4. WO2010141023A1 describes a video conference system that determine a participant distance and aligning a region of interest on the participant using one or more depth cameras: creating a cropped video stream of the participant by cropping the region of interest from a video stream of the participant; and arranging the cropped video stream of the participant with additional cropped video streams of additional participants for display in the video conference.

Disadvantages with this solution is that the video is cropped and thus the field of view of the camera is severely restrict, the viewer is prevented to see the other parts of the video that might be of interest to the user (non-detected regions of interest), and it only consider having one rectangular region of interest (restrictive). If two persons are "of interest" on respectively the left and right parts of the video, the detected region of interest will be almost the complete video since the method use a rectangular cropping.

Other techniques aim at recognizing important parts in the image and preserve those regions while scaling the image. In a video conference that would aim at scaling the images so that the people are displayed while not so important parts of the images is hidden as schematically illustrated in FIG. 5.

In Patent document EP2417771A1 it is disclosed a method for performing vector retargeting process with respect to video frame, involves determining importance values for one or more identified objects. The method involves identifying one or more objects within a vector video frame. The importance values for one or more identified objects are determined. The video frame is retargeted based on importance values corresponding to the identified object.

However the disclosed non-uniform image resealing is only possible on vector images and not raster/matrix images. The proposed way to solve this by converting raster/matrix images to vector results in limited quality especially for natural videos such as conferencing videos. On a raster image, the image is segmented (background, objects) and each segment is non-uniformly scaled or simplified according to a spatial budget. A further disadvantage is the method cannot have a more fine grain scaling within one segment. Also, even though the method detect important objects in the (vector or raster) video, it does not detect and treat differently the active speakers.

In patent document EP2218056B1 and the literature "*A System for Retargeting of Streaming Video*", Philipp Krähenbühl, Manuel, Alexander, Markus Gross, *SIGGRAPH* 2009, two content-aware resizing of images and videos algorithms are presented. These algorithms are different versions of non-uniform video retargeting among others. Disadvantages with these solutions are based on the fact that they are not optimized for video conference applications, e.g. they do not take into account the active speakers and during a video conference application the active speakers are the most important region of interest, and they do no preserve participant's bodies and in a video conference the body language is very important.

In a video conference, another problem concerns the screen size adaptation. It exists various sizes of screen and several aspect ratios (4:3, 16:9, etc.) and if one wants to display a specific content acquired at a certain aspect ratio on a display having a different aspect ratio, one has to adapt the video stream to the display aspect ratio. Most of the time, the video players linearly scale up or down to adjust to the screen size and either insert black borders on the top and bottom of the display as illustrated in FIG. 3A, or either crop the video top/bottom parts in order to fix the aspect ratio issue.

Inserting black borders results in a reduced field of view and thus induces a lower quality of experience. On the other hand, cropping completely removes parts of the video that might be of interest to the user and thus might induce an even lower quality of experience.

Below will follow some definitions and descriptions of existing technology:

Image Cropping, Uniform Scaling

Cropping refers to the removal of the outer parts of an image to improve framing, accentuate subject matter or change aspect ratio. The character * means multiplication with.

Let us define I, an image of size W*H.

Cropping consists in extracting a rectangular region R (Xr,Yr,Wr,Hr) of the image I:

$I_{cropped} = I(x,y)$, for all x: Xr<x<Xr+Wr and
for all y: Yr<y<Yr+Hr.

Linear, uniform scaling consists in resizing the image I to a new size W2*H2.

$I_{scaled} = \text{sample}(I, x*W2/W, y*H2/H)$.

Where sample( ) is a function that linearly sample the image. Such as for instance, the bilinear interpolation which is an extension of linear interpolation for interpolating functions of two variables (e.g., x and y) on a regular 2D grid.

Content-Aware Image/Video Retargeting

Video retargeting aims at non-uniformly adapting a video stream in a context-sensitive and temporally coherent manner to a new target resolution. E.g. to be able to resize, as well as change aspect-ratio, or zoom into one or several parts of the video at the same time, while scaling away unimportant parts. We are trying to find a spatio-temporal warp $w_t$ $R^2 \rightarrow R^2$, i.e., a mapping from coordinates in $I_t$ (image I at time t) to new coordinates in $I_t$ such that $I_t * w_t = O_t$ represents an optimally retargeted output frame with respect to the desired scaling factors and additional constraints.

Image warping is a non-linear deformation which maps every point in one image to a point in another image.

The following approach of *"A System for Retargeting of Streaming Video"*, Philipp Krähenbühl, Manuel, Alexander, Markus Gross, SIGGRAPH 2009 is a good example of video retargeting. Given a current frame $I_t$ of the video stream the system automatically estimates visually important features in a map (Fs) based on image gradients, saliency, motion, or scene changes. The saliency map (Fs) is estimated in order to detect where the content can be distorted and where it should be avoided. Next, a feature preserving warp $w_t$ to the target resolution is computed by minimizing an objective function $E_w$ which comprises different energy terms derived from a set of feature constraints. The optimal warp is the one minimizing a combined cost function (a.k.a energy) $E_w$ such that:

$$E_w = E_g + \lambda_u E_u + \lambda_b E_b + \lambda_s E_s + \lambda_c E_c$$

Where Eg is the global scale energy, Eu the uniform scale constraint containing the saliency map values, Eb the bending energy, Es edge sharpness energy and Ec is the bilateral temporal coherence energy. The equations are further defined by Krähenbühl et. al. These energies measure local quality criteria such as the uniformity of scaling of feature regions, the bending or blurring of relevant edges, or the spatio-temporal smoothness of the warp.

Finding the best warp $w_t$ is then obtained by solving the following problem $$w_t = \mathrm{argmin}_w(E_w),$$

where all energies are written in a least square manner and the system is solved using a non-linear least square solver. Also a different number and type of energies may be used.

There exists different video retargeting methods such as seams carving, many of them described in the survey *"A survey of image retargeting techniques"*, Daniel Vaqueroa, Matthew Turka, Kari Pullib, Marius Ticob, Natasha Gelfandb 2010.

Sound Source Localization

Sound source localization aims at locating the sound or speaker in a video conferencing scenario based on a set of microphones.

Traditionally, algorithms for sound source localization rely on an estimation of Time Difference of Arrival (TDOA) at microphone pairs through the GCC-PHAT (Generalized Cross Correlation Phase Transform) method. When several microphone pairs are available the source position can be estimated as the point in the space that best fits the set of TDOA measurements by applying Global Coherence Field (GCF), also known as SRP-PHAT (Steered Response Power Phase Transform), or Oriented Global Coherence Field (OGCF). The point can be estimated in a 3D space if the microphones are not aligned.

FIG. 6A illustrates the geometry used for calculating sound direction based on interaural delay. Calculation of the interaural time difference (ITD) between two microphones specifies a hyperbolic locus of points upon which the corresponding sound source may reside. For target distances ($D_L$ and $D_R$) much greater than the microphone spacing $D_M$, the target bearing angle may be approximated as $$\theta \cong \sin^{-1}\left(\frac{D_L - D_R}{D_M}\right)$$

Rewriting the difference in target distance in terms of the interaural time delay, one obtains $$\theta \cong \sin^{-1}\left(\frac{V_{sound} \cdot ITD}{D_M}\right)$$

where $V_{sound}$ for a comfortable indoor environment is approximately 344 m/s.

Several types of ITD features may be extracted from a microphone pair. One technique is Cross-Correlation.

The windowed cross-correlation rlr(d) of digitally sampled sound signals l(n) and r(n) is defined as $$r_{lr}(d) = \sum_{n=N_1}^{N_2} l(n)r(n-d)$$

where $N_1$ and $N_2$ define a window in time to which the correlation is applied. The value of d which maximizes rlr(d) is chosen as the interaural delay, in samples. Cross-correlation provides excellent time delay estimation for noisy sounds such as fricative consonants. For voiced consonants, vowel sounds, and other periodic waveforms, however, cross-correlation can present ambiguous peaks at intervals of the fundamental frequency. It also provides unpredictable results when multiple sound sources are present. Finally, sound reflections and reverberation often found in indoor environments may corrupt the delay estimation.

Another formulation of the positioning problem is described in the paper *"Robust Sound Source Localization Using a Microphone Array on a Mobile Robot"*, Jean-Marc Valin, Franc, ois Michaud, Jean Rouat, Dominic L'etourneau:

Once TDOA estimation is performed, it is possible to compute the position of the source through geometrical calculations. One technique based on a linear equation system but sometimes, depending on the signals, the system is ill-conditioned and unstable. For that reason, a simpler model based on far field assumption is used, where it is assumed that the distance to the source is much larger than the array aperture FIG. 6C illustrates the case of a 2 microphone array with a source in the far-field. Using the cosine law, we can state that:

$$\cos\phi = \frac{\vec{u} \cdot \vec{x}_{ij}}{\|\vec{u}\| \, \|\vec{x}_{ij}\|} = \frac{\vec{u} \cdot \vec{x}_{ij}}{\|\vec{x}_{ij}\|}$$

where $\vec{x}_{ij}$ is the vector that goes from microphone i to microphone j and $\vec{u}$ is a unit vector pointing in the direction of the source. From the same figure, it can be stated that:

$$\cos\phi = \sin\theta = \frac{c\Delta T_{ij}}{\|\vec{x}_{ij}\|}$$

where c is the speed of sound. When combining the two equations, we obtain:

$$\vec{u}\cdot\vec{x}_{ij}=c\Delta T_{ij}$$

which can be re-written as:

$$u(x_j-x_i)+v(y_j-y_i)+w(z_j-z_i)=c\Delta T_{ij}$$

where $\vec{u}=(u, v, w)$ and $\vec{x}_{ij}=(x_j-x_i, y_j-y_i, z_j-z_i)$, the position of microphone i being $(x_i, y_i, z_i)$. Considering N microphones, we obtain a system of N−1 equations:

$$\begin{bmatrix}(x_2-x_1) & (y_2-y_1) & (z_2-z_1)\\(x_3-x_1) & (y_2-y_1) & (z_3-z_1)\\\vdots & \vdots & \vdots\\(x_N-x_1) & (y_N-y_1) & (z_N-z_1)\end{bmatrix}\begin{bmatrix}u\\v\\w\end{bmatrix}=\begin{bmatrix}c\Delta T_{12}\\c\Delta T_{13}\\\vdots\\c\Delta T_{1N}\end{bmatrix}$$

In the case with more than 4 microphones, the system is over-constrained and the solution can be found using the pseudo-inverse, which can be computed only once since the matrix is constant. Also, the system is guaranteed to be stable (i.e., the matrix is non-singular) as long as the microphones are not all in the same plane.

The linear system expressed by the system above is theoretically valid only for the far-field case. In the near-field case, the main effect on the result is that the direction vector $\vec{u}$ found has a norm smaller than unity. By normalizing $\vec{u}$ it is possible to obtain results for the near-field that are almost as good as for the far-field. Simulating an array of 50 cm×40 cm×36 cm shows that the mean angular error is reasonable even when the source is very close to the array, as shown by FIG. 6D. Even at 25 cm from the center of the array, the mean angular error is only 5 degrees. At such distance, the error corresponds to about 2-3 cm, which is often larger than the source itself. For those reasons, we consider that the method is valid for both near-field and far-field. Normalizing $\vec{u}$ also makes the system insensitive to the speed of sound because Equation 13 shows that c only has an effect on the magnitude of $\vec{u}$. That way, it is not necessary to take into account the variations in the speed of sound.

Face Detection

A face detection algorithm aims at locating faces in an image or video. The output of this type of algorithm is often a set of rectangles {R (Xr,Yr,Wr,Hr)} positioned exactly onto the detected faces and centered onto the noise, wherein Xr and YR means the coordinates in X and Y plane, Wr indicates the width and Hr the height of the rectangle.

A fast and efficient method is called Haar face detection. Haar-like features are digital image features used in object recognition. They owe their name to their intuitive similarity with Haar wavelets and were used in the first real-time face detector.

Body Detection

A body detection algorithm aims at locating not only faces, but also parts of or the whole body in an image or video.

Body Detector/Tracker

A body detector is any device that can localize the static or moving body of a person (shape) over time. It may also be called body sensor or body tracker, or only tracker.

Video Conference

It is well-known that in a video conference application the active speakers are the most important region of interest that is likely to be observed/focused on by a viewer, and that the body language is an important factor of communication and thus one has to avoid altering it.

SUMMARY

The object of the embodiments is to provide a fast and accurate method and arrangement for video conferencing, which overcome the drawbacks of the prior art. This is achieved by the method and arrangement as defined in the independent claims, wherein sound localization is used for accurately preserving active speakers in a retargeted video.

According to a first aspect of the embodiments, a method for video conferencing to be performed by a network element is provided. In the method sound localization is used to determine the active speaker. Further the active speaker location is used to detect an image region that is used when creating a preserving map (may also be called preservation map, or mask) with areas of the image that should be preserved wile retargeting the video. The retargeting method may be nonlinear.

A preserving map is here to be understood as a weight map where one or several parts of an image that should be preserved during video retargeting are defined. It may also be referred to as a preservation map or weighting map.

The method may further utilize face detection, depth sensors or body detectors when creating the preserving map. The method may also utilize aspect ratio adaption and/or video mixing adaption.

It may further utilize temporal smoothing if several people speak in the video conference. It may also allow a viewer to request at least one region to display. The method may further allow viewing of the retargeted video and the original video at the same time, or two or more retargeted videos.

According to a second aspect of the embodiments, a network element for enabling video conferencing, wherein sound localization is used to determine the active speaker is provided. The network element comprises a processor and memory, wherein the memory contains instructions executable by the processor. The network element is operative to use the active speaker location to create a preserving map with areas of the image that should be preserved and to retarget the video based on that preserving map.

The network element may further comprise any or all of a face detector, a body detector, or a depth sensor in order to determine image regions used to create the preserving map.

The network element may further be operative to receive requests from a viewer which regions of the video to display. It may also be operative to display the retargeted video and the original video at the same time. It may also be operative to display two or more retargeted videos at the same time.

The network element may further be operative to use aspect ratio adaption and/or video mixing adaption. It may further be operative to use temporal smoothing if several people speak.

According to a third aspect of the embodiments, a computer program for enabling video retargeting in video conferences is provided. The computer program comprises code means which when run on a computer causes said computer to receive a video stream from a video conference, use the sound to calculate the localization of the active speaker, calculate an image preserving map based on the speaker localization, and retarget the video according to the preserving map. The computer program may further comprise code means which when run on a computer executes other parts of the method described above.

According to a fourth aspect of the embodiments, a computer program product is provided. The computer program product comprises computer readable code means and a computer program as defined above stored on said computer readable code means.

With aspect ratio adaption, it is in this text to be understood as that the video from a sender has a specific aspect ratio and the display of a receiver has another aspect ratio, different from the video one. The aim here is hence to resize the video stream so that it matches the screen aspect ratio. If you have a movie shot in 4:3 and a screen having a LCD panel 16:9, then the video has to be resized/retargeted (usually linearly or by adding black borders on the top/bottom, except in this invention).

With video mixing, it is in this application to be understood as that, a network element (typically) performs a mix of several videos coming from various senders in order to send only one video containing a mix of all or parts of the incoming videos to a receiver. Usually, the current active speaker is placed as the main video (taking most of the space) and the remaining videos in a small (thumbnail) format. These small videos usually have fixed known dimensions and can be independent of the receiver screen size. So in this specific case, the aspect ratio targeted in known by the device performing the video mixing and thus the receiver may or may not need to send its screen size or aspect ratio to the network element, even though it would be good to have it not for the thumbnail retargeting but for the main video retargeting and/or videos arrangement.

An advantage with the embodiments of the present invention is that compared to the cropping (FIG. 4), the viewer is still allowed to see the overall captured scene that might be of interest to the user. There is no restriction to one rectangular region of interest (as with WO2010141023A1) as more advanced regions are allowed using a nonlinear scaling.

A further advantage with embodiments is that compared to the linear scaling (FIG. 3B), the proper aspect ratio is kept. The embodiments are also more efficient in removing the unnecessary areas that are not of interest.

Yet another advantage is that compared to black borders (FIG. 3A), the embodiments take advantages of using the full screen area and thus increase the viewer's field of view.

Other further advantages with at least some embodiments compared to prior art are:
- Active speaker is more important than others; the embodiments detect them and prioritize them.
- The advanced weighting scheme supports 1D/2D/3D localizations of speakers and/or quiet people.
- The embodiments not only preserve the people's faces but also their body because the body language is important during a video conference call.
- The use of a depth sensor/body tracker allows accurate body localization
- The unique video arrangement system dedicated for video conference allows resizing the videos for any purposes while maintaining the currently speaking persons preserved from strong distortions.

DETAILED DESCRIPTION

An object of embodiments is to provide a fast and accurate method and arrangement for video conferencing, which overcome the drawbacks of the prior art.

Figure 1:
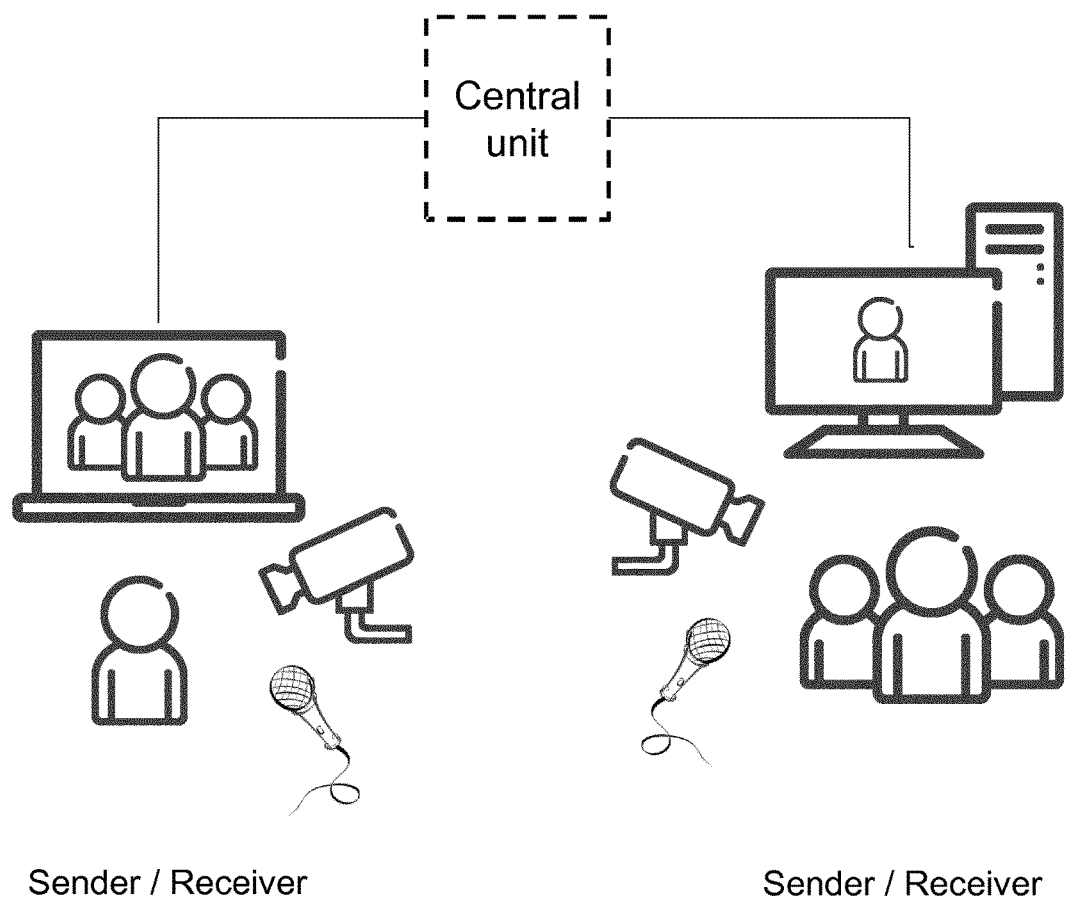
FIG. 1 illustrates schematically a video conference system, according to prior art.

FIG. 1 illustrates schematically a video conference system where the embodiments of the present invention can be implemented. The sender and receiver may connect directly or via a central unit.

Figure 2A:
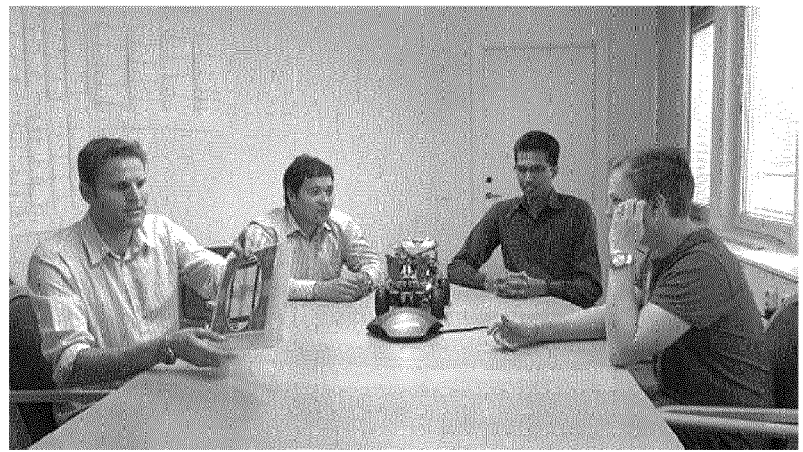
FIGS. 2A and 2B illustrates schematically original video streams according to prior art and embodiments.
Figure 2B:
Figure 3A:
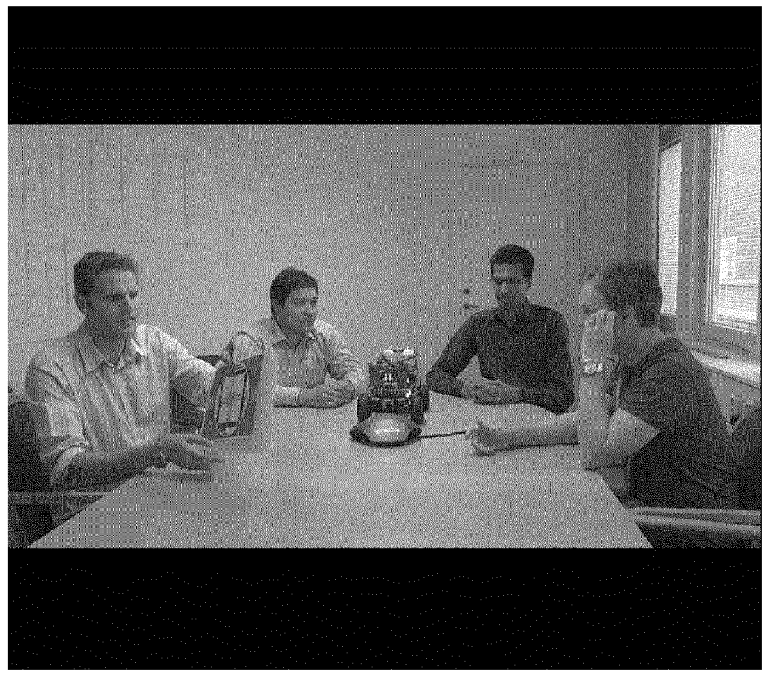
FIG. 3A illustrates schematically a video stream that has been scaled with black borders, according to prior art.
Figure 3B:
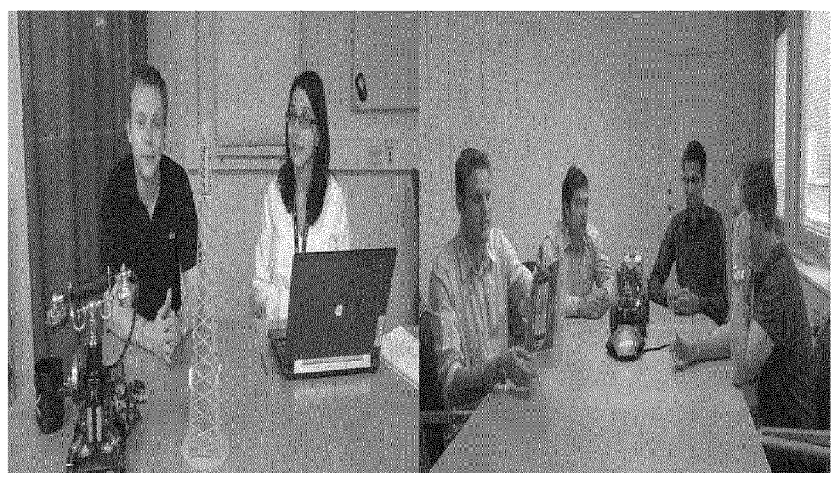
FIG. 3B illustrates schematically a video stream that has been linearly scaled and arranged, according to prior art.
Figure 4:
FIG. 4 illustrates schematically prior art where video streams have been cropped and arranged.

FIGS. 2A and 2B illustrate original video streams which are processed used to illustrate aspects of embodiments of the present invention.

Figure 6A:
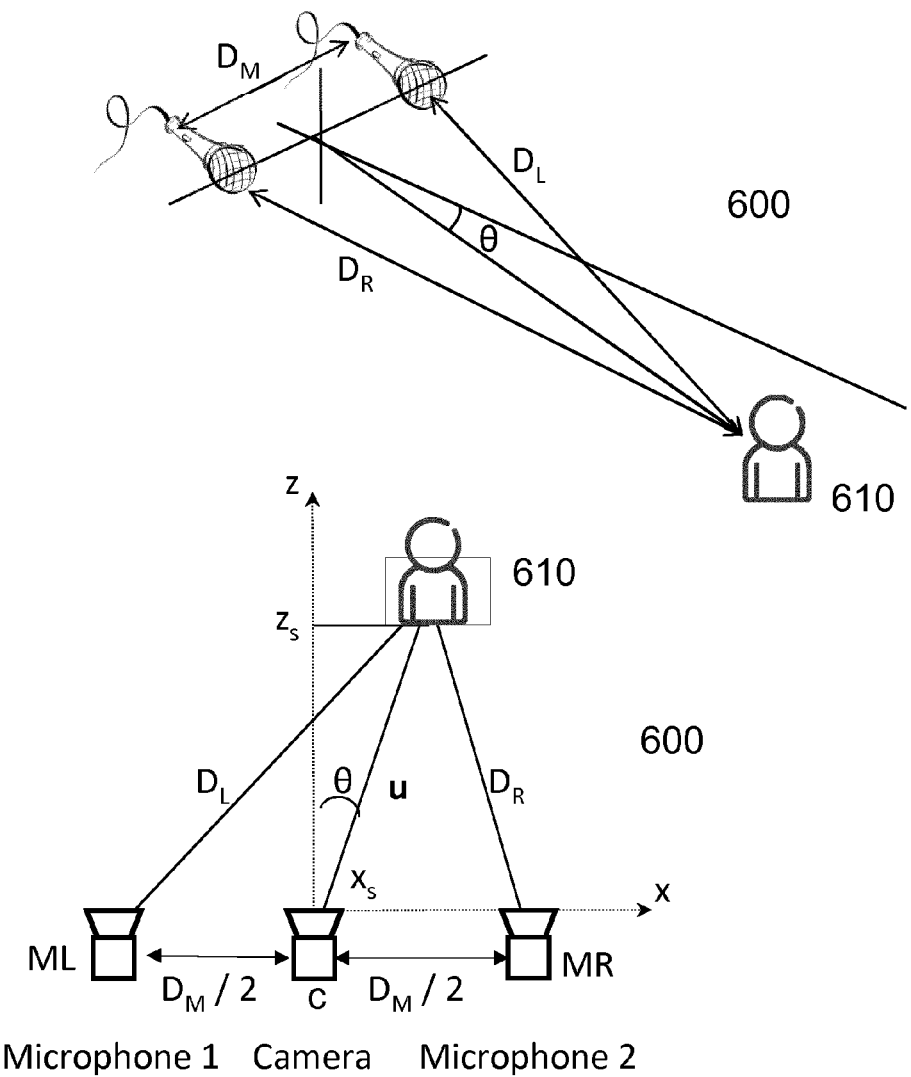
FIGS. 6A, 6B and 6C illustrates schematically the use of sound localization, according to prior art.
Figure 7:
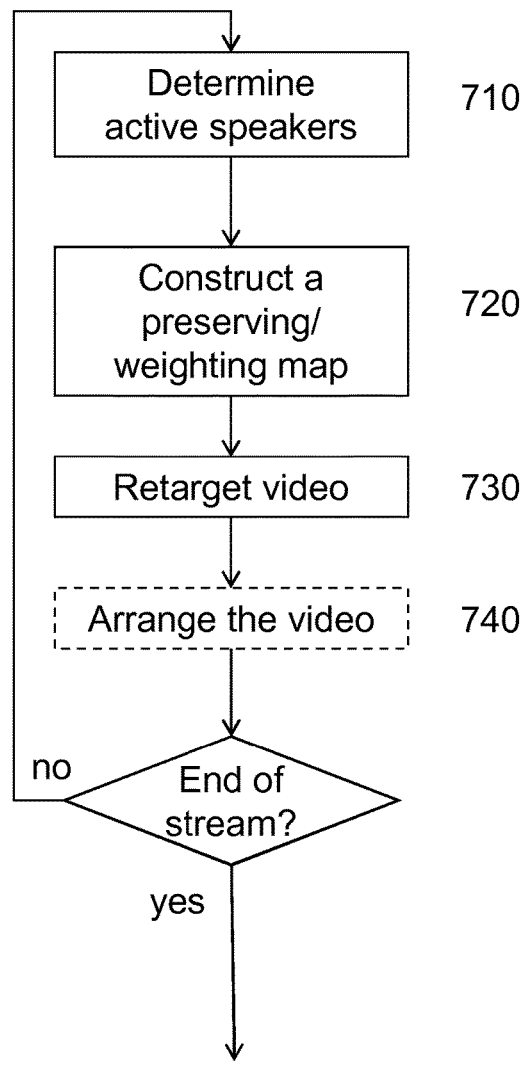
FIG. 7 is a flowchart illustrating a method according to embodiments of the present invention.

FIG. 7 gives an overall flowchart of a method according to one embodiment. According to the flowchart of FIG. 7, one embodiment provide a method for video conferencing to be performed by a network element, wherein sound localization 600 is used (as illustrated in FIG. 6A) to determine 710 the at least one active speaker. The speaker location is used when to create 720 a preserving map with the areas of the image that should be preserved. The video is then retargeted 730 based on the preserving map.

This method allows video conferences to be displayed on various terminal devices and screen sizes where important areas such as the active speaker(s) remain unchanged while stretching and squeezing is hidden in image areas, where it is less noticeable.

The video target size $Sd=(Wd, Hd)$ is considered to be known a priori, for instance coming from the display or player setup.

According to an embodiment, the locations of the active speakers are first determined 710 in the video stream using one of the methods described later. Let's note A, a detected speaker (region in the video) and As the list of detected regions. The representations and dimensions of a region A vary depending on the employed method according to speaker detection embodiments.

Then the detected regions As are converted 720 into a preserving map matrix P of size $S=(W, H)$ where each value $P(i,j)$ represents the importance of the content at pixel coordinate $(i,j)$ of the video. In a video conference scenario the following order of importance may be considered: active speaker as the most important region, then the quiet persons (then the salient areas), then the remaining regions such as the table, walls, etc.

Then, a video retargeting algorithm is employed 730 on the video stream using the preserving map estimated in the previous step. This algorithm resizes the video from a size Sd to the size S. The resizing may be nonlinearly.

Finally, in some embodiments an optional step arranges 740 the videos of participants.

Active Speakers Detection 710 and Generation of Preserving Map Matrix 720

It will now in more detailed be described different embodiments that could be employed in order to detect the current active speaker according to the available sensors. That information is then used to construct the preserving map matrix per frame of the video.

Let $I_t$ be the frame of the video V at time t. $P_t$ corresponds to the preserving map of the frame $I_t$.

In embodiments a microphone array containing at least 2 microphones and a depth sensor and a face detector and/or a body detector is used.

The face detector and or body detector allows detecting the video conference participant in the video and the microphone array to detect the current active speaker. In embodiments the active speaker is assigned a higher maximal weight $W_{max}$ than the quiet participants.

Embodiments with a Microphone Array (at Least Two Microphones)

Figure 6B:
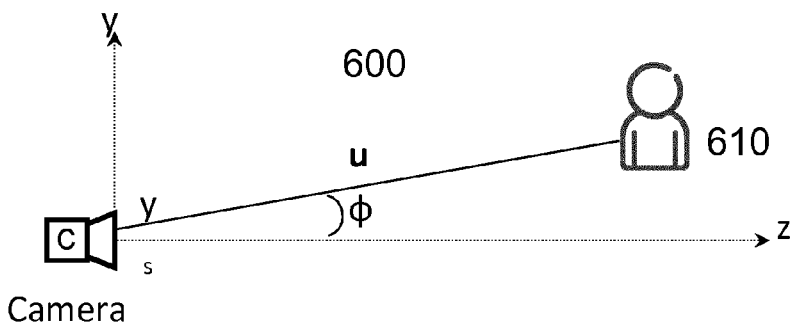
Figure 6C:
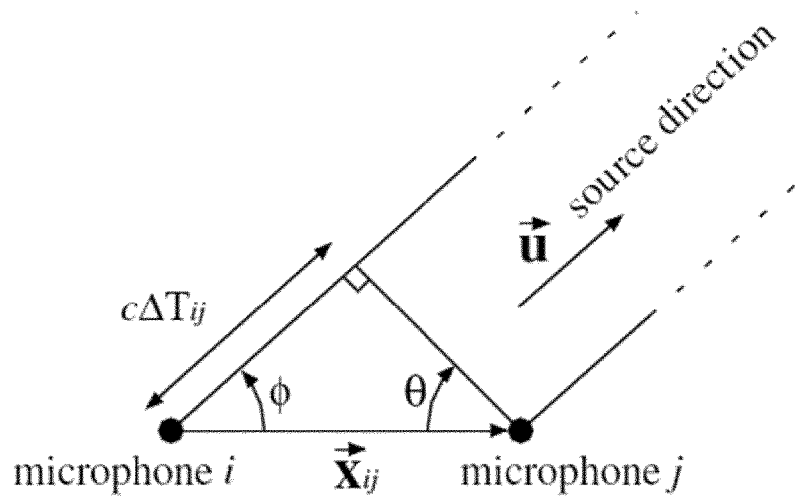
Figure 6D:
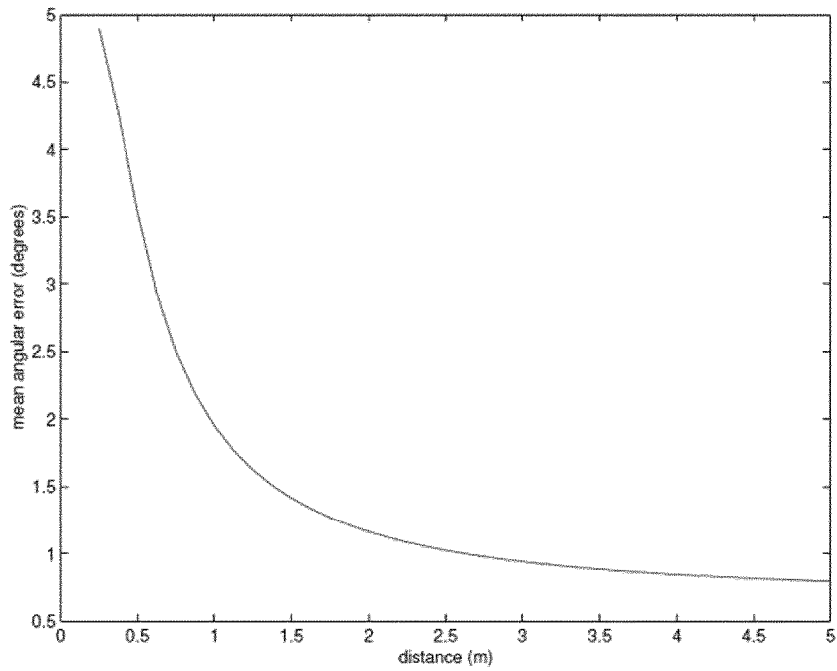
FIG. 6D illustrates mean angular error as a function of distance between the sound source and the center of the array for near-field, according to some aspects of the embodiments.

As it has been shown in the background, a microphone array as illustrated in FIGS. 6A and 6C may be used in order to detect the position of the active speaker. Depending of the number of microphones and their arrangement, it is possible to locate the speaker in different dimensions (1D, 2D, 3D). Here we describe the 3 cases.

In embodiments the microphone array-based speaker localization gives the position of the speaker 610 in the camera coordinate system. In one embodiment as illustrated in FIG. 6A the system is setup with two microphones. U represents the direction and distance of the speaker with respect to the camera C, expressed in the camera coordinate system. In this setup, we consider the camera and microphone array to be aligned. It is known to the state of the art man that a simple change of coordinate system given by a calibration procedure allows more general configurations.

General Case

Figure 8A:
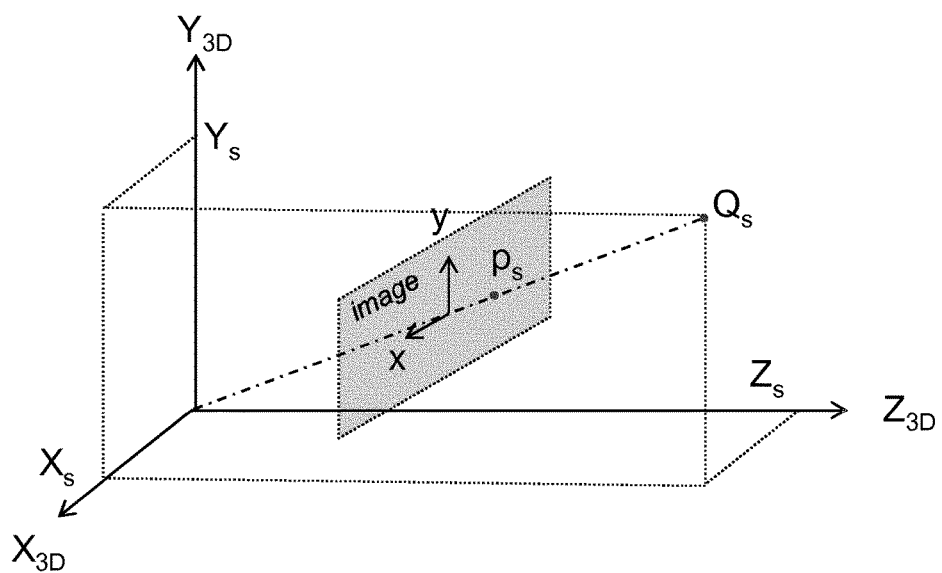
FIG. 8A illustrates schematically some aspects of the embodiments of the present invention projecting a speaker position from 3D to a 2D image/video.

The 3D point $Qs=(X_s, Y_s, Z_s)$, as illustrated in FIG. 8A, representing the position of the speaker projects to the camera frame (video) in $p_s=(x_s, y_s)$ according to the following well-known equation:

$$p_s=\psi(M*Q_s),$$

where M is the camera projection matrix using the well-known pinhole model $M=K*[R\ t]$, with K being the intrinsic camera parameters such as focal length $(f_x,f_y)$, principal point $(u_0,v_0)$ etc., R and t being the change of coordinate system from the coordinate system in which Qs is expressed to the camera coordinate system. $\psi([x; y; w])=[x/w; y/w; 1]$.

In other embodiments other camera models may be used instead of the pinhole model, including but not limited to the omnidirectional model.

Figure 8B:
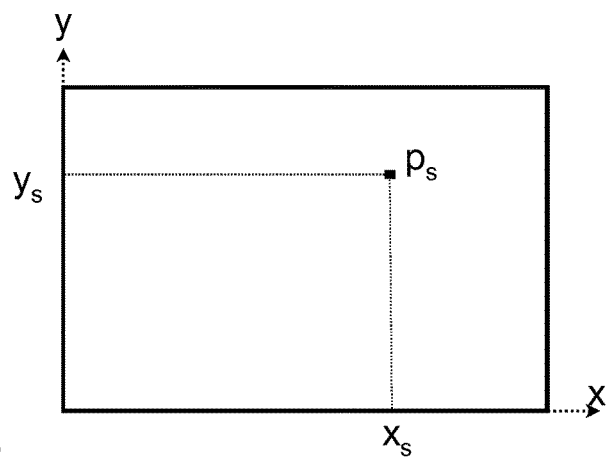
FIG. 8B illustrates schematically some aspects of the embodiments of the present invention of a projected speaker position on a 2D image/video from 3D localization.

An example of projected point from 3D is depicted in FIG. 8B.

1D and 2D Case

In embodiments with only two microphones, as it is shown in the background, it is only possible to localize the direction ($\theta$) of the speaker with respect to the camera.

Using the geometrical relationship, we know that $$x_s=u_0+f_x*u_x/\|u\|=u_0+f_x*\cos(\theta).$$

In embodiments with three or more non-aligned microphones we are able to also estimate the $y_s$ coordinate of the speaker in the video frame, from $\phi$ as shown in FIG. 6B.

$$y_s=v_0+f_y*\cos(\phi).$$

Figure 8C:
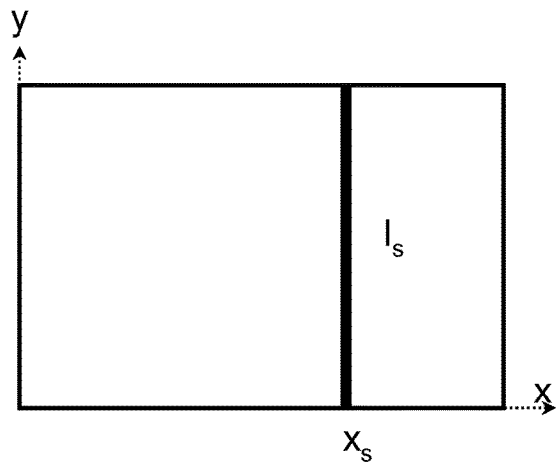
FIG. 8C illustrates schematically some aspects of the embodiments of the present invention of a projected speaker position on a 2D image/video from 1D/2D localization.

As specified in the background, in embodiments with four or more microphones, it is possible to fully estimate u, and thus Qs and the projection can be estimated using the general projection equation (general case). In case the sound localization provides the speaker position in another coordinate frame than the image and considering the two coordinate systems are known, the vector u can be expressed in the camera 3D coordinate system as a 3D plane that can then be projected onto the image/video (forming the line $l_s$) using the method described above (general case). An example of projected line from 1D/2D is depicted in FIG. 8C.

Figure 10A:
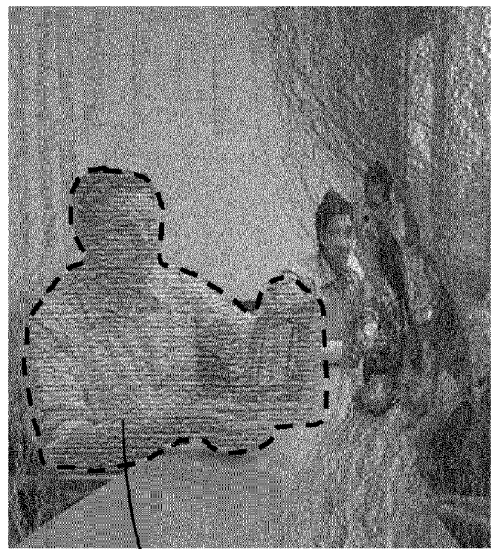
FIG. 10 A-D illustrate schematically some aspects of the embodiments of the present invention using preserving maps for a video stream.
Figure 10B:
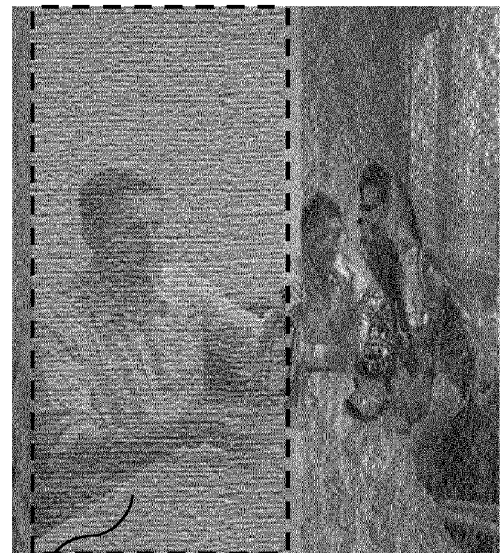
Figure 10C:
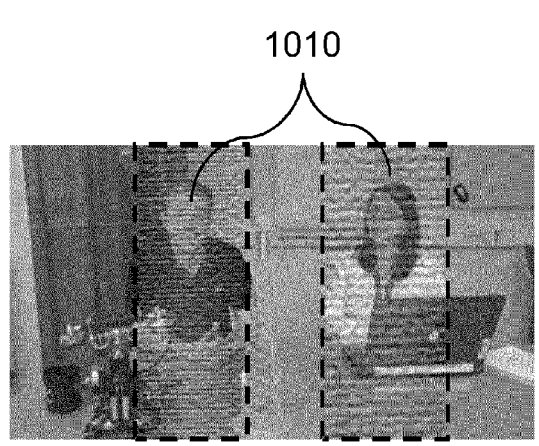
Figure 10D:
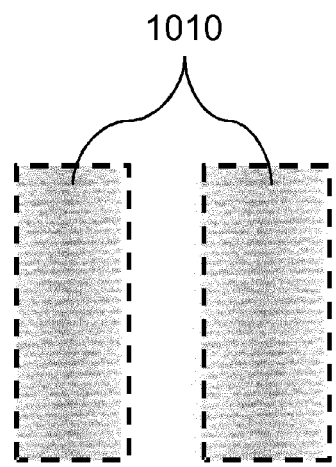

In embodiments where we only have $x_s$, we can still construct the preserving map thanks to a simple but efficient Gaussian weighting:

$$P(x,y)=W_{max}*\exp(-0.5*((x-x_s)/\sigma^2)),$$

for all y in [0, H], all x in [0, W], with $\sigma$ and $W_{max}$ two parameters chosen during the implementation. $\sigma$ is the standard deviation corresponding to how big the width of the map will be. In embodiments where there is no knowledge about the distance between the speaker and the camera, as in the 1D/2D case, then $\sigma$ may for instance be set to $1/10^{th}$ of the video width. In other embodiments the total number of speakers Sn is tracked and then a ratio of it may be used, for instance $\sigma=1/Sn$ (other ratios may be used). $W_{max}$ is also to be chosen and often depends on the video retargeting algorithm employed afterwards. In embodiments the implementation may be faster if a windowed version of the Gaussian weighting is chosen, or the same weight is assigned to the whole rectangle (P(x,y) =Wmax, for all y in [0, H] and all x: xs−ws/2<x<xs+ws/2, see FIG. 10B the rectangle 1010, ws being the window width.

An example of such a weighting is given in FIG. 9A and FIG. 10C and FIG. 10D 1010. In embodiments where we only have the 2D line $l_s$, we can still construct the preserving map thanks to a simple but efficient Gaussian weighting:

$$P(x,y)=W_{max}*\exp(-0.5*((x-l_s(y_s))/\sigma^2)),$$

for all y in [0, H], all x in [0, W], where $l_s$ is defined as a 2D line: $l_s(y_s)=x_s=a_s*y_s+b_s$, with a and b two constants defining $l_s$.

3D Case

Figure 9A:
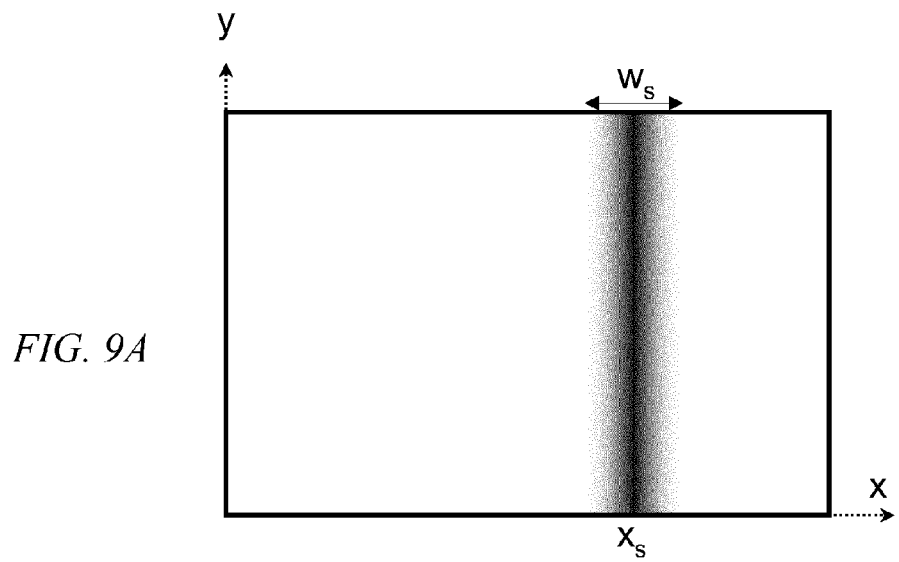
FIG. 9A illustrates schematically an example of a preserving map providing that the speaker is known in 1D/2D with a microphone array only according to some aspects of the embodiments of the present invention.
Figure 9B:
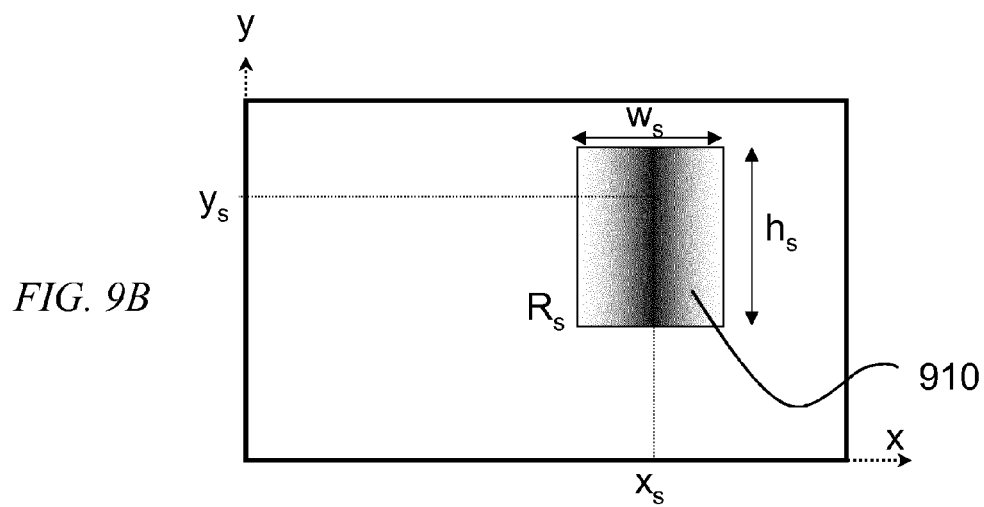
FIG. 9B illustrates schematically an example of a preserving map providing that the speaker is known in 3D with a microphone array only according to some aspects of the embodiments of the present invention.
Figure 9C:
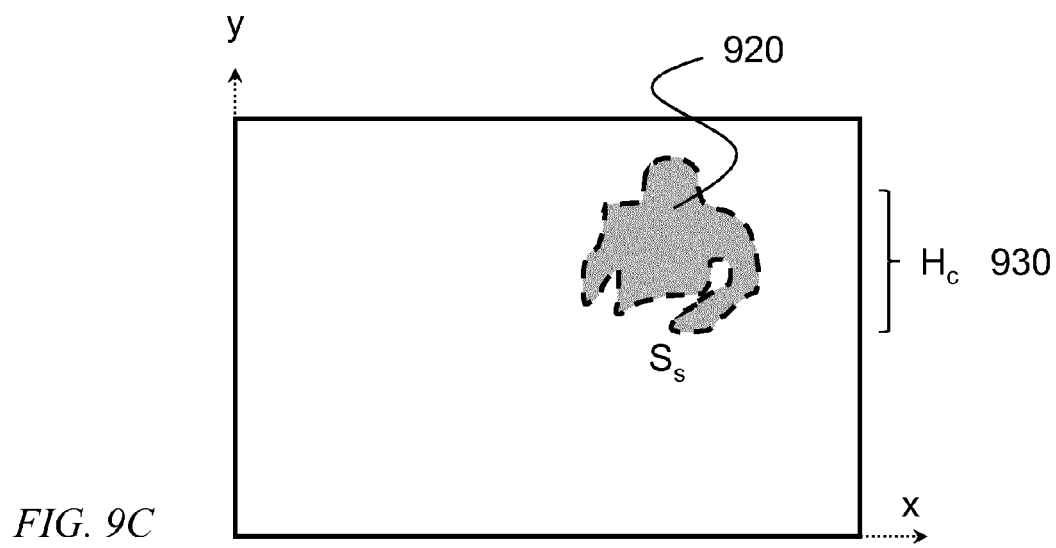
FIG. 9C illustrates schematically an example of a preserving map providing that the speaker's body is known in the image/video with a microphone array and a depth sensor or body sensor according to some aspects of the embodiments of the present invention.

In embodiments where the depth information of the speaker (distance between the speaker and the camera) is available, i.e. Qs is known, a more restricted preserving region can be defined as depicted in the FIG. 9B.

Once the speaker is located in the video (at $p_s=(x_s, y_s)$), the following preserving map may be constructed, as depicted in FIG. 9B:

$$P(x,y)=W_{max}*\exp(-0.5*((x-x_s)/\sigma(y))^2),$$

for all y: ys+dy−hs/2<y<ys+dy+hs/2 and all x: xs−ws/2<x<xs+ws/2 where P(x,y) is the preservation map value at 2D position (x,y), $W_{max}$ is a maximum weight value, $\sigma(y)$ is the Gaussian standard deviation and where the rectangle 910 $R_s$ (center=(xs, ys+dy), size=(ws,hs)) is constructed in order to be fitted to the speaker's head and body and are estimated based on the speaker's depth ($z_s$) and common characteristics of humans such as mean head and body sizes. In one embodiment the following equations, which has empirically proved to be suited for video conferences, are used:

$$ws=f_x*W_{body}/z_s, \text{ with } W_{body}=0.5 \text{ m (representing the mean chest width)},$$

$$hs=f_y*H_{trunk}/z_s, \text{ with } H_{trunk}=0.6 \text{ m (representing the mean trunk height) and}$$

$$dy=f_y*H_c/z_s, \text{ with } H_c=H_{trunk}/2-H_{face}/2 \text{ with } H_{face}=0.25 \text{ m}$$

where $H_{face}$ represents the average head height, $H_c$ represents a distance 930 between the body half and the head mouth, dy is the same distance as $H_c$ but converted to pixels, hs is the average trunk height expressed in pixel and $z_s$ is the speaker depth. $f_x$ is camera focal length on x-axis and $f_y$ is is camera focal length on y-axis.

$\sigma(y)$ can be constant $\sigma(y)=\sigma$ or can be increased in order to better cover the body:

$$\sigma(y)=\sigma_{head} \text{ for all } y<y_{head}+hs/4 \text{ and}$$

$$\sigma(y)=\sigma_{body} \text{ otherwise}$$

where $\sigma_{head}$ is a Gaussian standard deviation suited for the head, $\sigma_{body}$ is a Gaussian standard deviation suited for the body, $x_s$ is the located speaker position on x axis, and $y_{head}$ is the speaker head y location with $y_{head}=ys+dy-hs/2$ and $\sigma_{head}$ and $\sigma_{body}$ being two values specified during the implementation, typically $\sigma_{head}<\sigma_{body}$.

In other embodiments a different weighting scheme is used, for instance using a simple body model or even a simple rectangle with uniform weights as previously described.

In yet other embodiments the method is applied on audio streams that can be encoded in an audio file/stream instead of using the microphone array. Then the audio stream may first be decoded in order to get the audio signal form the microphones, in order to apply the method on the signal.

Embodiments with a Microphone Array and One or More Depth Sensors

It is known by the state of the art man that one or more body detectors such as depth sensors (also denoted depth cameras) can be used to detect the participants from the sensed depth maps. This type of device not only provides the virtual 3D location of the speaker but also all the pixels in the video belonging to the detected persons.

A depth sensor is a sensor that gives the depth of each pixel of the video. Each frame of a video (or subset) can be associated with a frame of a depth video. Combining a depth sensor with a body pose estimation method can localize the exact pixels belonging to a person. Any sensor or method that can provide an accurate localization of the speaker body can be used in the embodiment and a depth sensor combined with a body pose estimation method is one way of doing. It could also be a smart body detector using only the video but they are usually less accurate. The output of any of such algorithms provides an accurate region of pixels.

Depth cameras go by many names: range sensor, LIDAR, time-of-flight (ToF) camera, and RGB-D camera. The underlying sensing mechanisms are equally varied: range-gated ToF, RF-modulated ToF, pulsed-light ToF, and projected-light stereo. The commonality is that all provide traditional (sometimes color) images and depth information for each pixel (depth images) at framerate. The DepthCam Sensor service provides information from a depth camera. One example of a common depth camera is Microsoft Kinect.

FIG. 9C 920 and FIG. 10A 1020 illustrates what can be detected by such a device. In embodiments D notes a matrix containing the ID (integer from 1 to N) of all the people detected in a video, and 0 otherwise. From this accurate person localization, a straightforward preserving map is constructed as follows:

$$P(x,y)=W_{max}*\max(D(x,y),1),$$

for all y in [0, H], all x in [0, W].

Note that in embodiments where a microphone array is combined with one or more depth sensors, it is possible to use fewer microphones in order to estimate Qs. We now need at least 2 microphones to detect the active speaker in 3D. Besides, knowing the projection $p_s$ allows us to get the ID of the active speaker using $ID_{active}=D(x_s,y_s)$ and thus use a more important weight for the active speaker, as follows:

$P(x,y)=W_{active}$ for all $y$ in [0, $H$], all $x$ in [0, $W$] and if $D(x,y)=ID_{active}$, $P(x,y)=W_{quiet}*\max(D(x,y),1)$ otherwise.

with for instance $W_{active}=W_{max}$ and $W_{quiet}=W_{max}/3$.

This will give more importance to the current speaker compared to the quiet persons while still avoiding to distort them severely. This method is more precise than using only a microphone array since we know precisely which pixels belong to the speakers and that is the ones to avoid distorting.

Also note that any devices that can detect a set of pixels belonging to the speaker can beneficiate from the same method.

Embodiments with a Microphone Array and a Face Detection and Tracking Algorithm

Figure 11A:
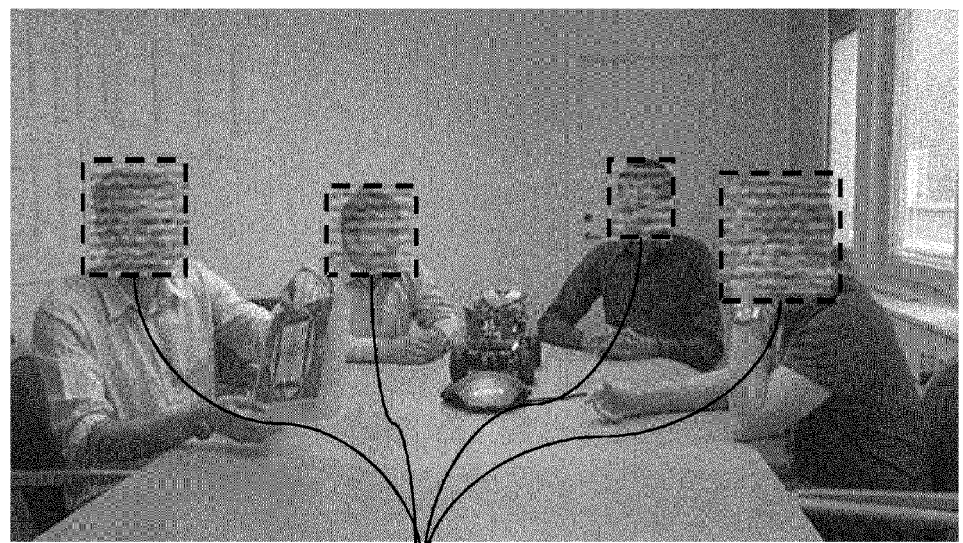
FIGS. 11A and 11B illustrates schematically some aspects of the embodiments of the present invention retargeting a video stream using preserving maps estimated on faces.
Figure 11B:
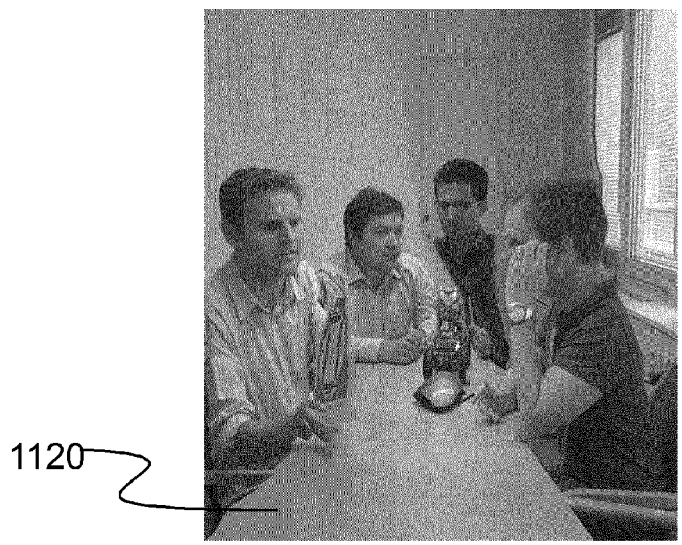

In another embodiment, the detection of the active speaker(s) using sound localization is combined with a face detector and/or body detector which is used to detect all the peoples in the video (even the quiet ones). An example of detected faces is depicted in FIG. 11A regions 1110. An example of resized video using the faces rectangles as a preserving map is given in FIG. 11B 1120.

As presented in the background section, a face detector and or body detector usually provides a list of rectangles (1220) $Fs=(center(x_{FS}, y_{FS}), size(W_{FS},H_{FS}))$ located onto the faces of the participants. Using human body statistics and the face detector characteristics, the approximate depth of the people is derived with the following relation:

$z_s=f_x*W_{face}/W_{FS}$ where $W_{face}$ is the mean face width, e.g. 15 cm, $f_x$ is the camera focal length on the x axis, $z_s$ the approximated depth, and $W_{FS}$ is the rectangle width given by the face detector. Note that also other metrics such as the inter-ocular distance may be used if given by the face detector.

Figure 12:
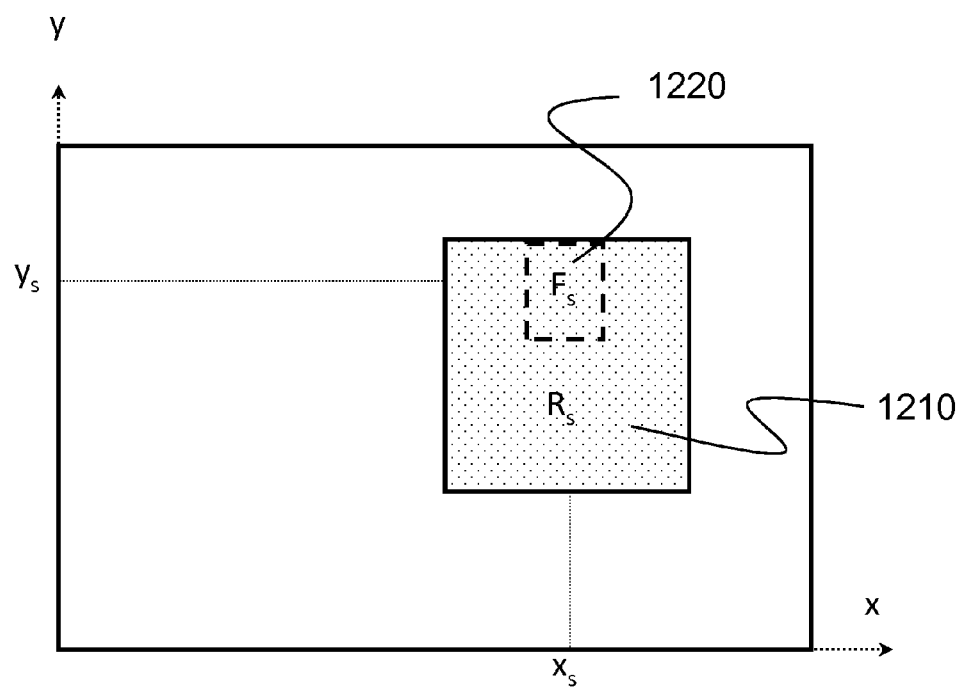
FIG. 12 illustrates schematically an example of a preserving map providing that a face has been detected, Fs being the output of the face detector according to some aspects of the embodiments of the present invention.

One can either use this depth value and use the same preserving matrix construction method of the 3D case as described earlier, or directly define $R_s$ 1210 based on Fs 1220 as depicted in FIG. 12, as follows $R_s$ center=$(x_{FS},y_{FS}+dy)$ and $R_s$ size=$(sx*W_{FS},sy*H_{FS})$, where $x_{FS}$ is the position of the center of the rectangle given by the fact detector on the x axis $y_{FS}$ is the position of the center of the rectangle given by the fact detector on the y axis dy, same as $H_c$ but expressed in pixel sx and sy are two scaling factors allowing to create a bigger rectangle based on the rectangle given by the face detector $W_{FS}$ is the width of the rectangle given by the fact detector $H_{FS}$ is the height of the rectangle given by the fact detector with dy=$H_{FS}$, sx=sy=3 for instance. These values are empirical values for video conferencing application where people are sitting around a table (so only showing their upper body part).

Then the same equation as described earlier in the 3D case can be used to construct P.

Once all the rectangles are estimated, a video cropping may be done since we are sure not to remove any participants. The cropped area is then the minimal rectangle containing all the rectangles $R_s$.

Embodiments Using Other Means to Determine the Preserving Map

Figure 13A:
FIG. 13A illustrates some aspects of the embodiments of the present invention wherein a viewer can define a region to be used for the preserving map.
Figure 13A:

In an embodiment the viewer defines the preserving map. The viewer who wants to see a specific region 1320 on the video 1340 may then manually define the matrix used for the preserving map. The viewer's input can be obtained by using a mouse pointer location (including the use of fingers on touch screens) as illustrated in FIG. 13A, eye movements or using an automatic gaze estimation (i.e. eyes' sight direction) that provides the region where the viewer is looking at.

In another embodiment the preserving map may be extracted from the metadata of a video, using for instance SDP, SEI messages or auxiliary pictures.

In the specific embodiment of the frame packaging using nonlinear video scaling, the active speaker detection can be let out and use only the internal saliency detection of the video retargeting algorithm.

Embodiments Combining Several Methods

In the case several active speaker detection methods are available a simple but efficient combination is to first perform the detections separately, then mix the obtained preserving maps in order to create only one map.

Let $P^i$ note the preserving map matrix given by the method I, and N the number of methods. In an embodiment only one matrix is created by blending the N methods with specific weights $b^i$:

$P=\Sigma_i b^i * P^i$,

Where the weights $b^i$ are defined by the implementation and $\Sigma_i b^i=1$ so that the total amount of energy is not increased. In one embodiment a lower weight is used for the person detectors than for the active speaker detectors. Other mixing methods can be used.

Embodiments Regularizing Preserving Map

The previously described preserving map creation is usually done on a per frame basis in order to get results connected to the video.

In order to cope with fast moving participants and alternating active speakers, the transitions may be made smooth otherwise the nonlinear deformation will be rapidly changing.

An embodiment blends the currently estimated preserving map at time t, $P_t$, using the following linear temporal regularizer:

$P=a*P_t+(1-a)*P_{t-1}$, with a learning factor a=0.2, for instance.

This optional step allows temporal smoothing and dealing with multiple alternating speakers. Other smoothing methods could also be used. Temporal smoothing (a.k.a. temporal regularization) corresponds to reducing the preserving map or warp function variations over time, usually by adding a temporal energy constraint or by blending the current preserving map with the previously estimated one.

Video Retargeting 730

In an embodiment, once the preserving map has been determined, a video retargeting algorithm that will non-uniformly resize the video stream to the target size may be employed using a slightly modified cost function. Here the preserving map P is introduced as a supplemental constraint directly the cost function such that:

$E_w=E_g+\lambda_u E_u+\lambda_b E_b+\lambda_s E_s+\lambda_c E_c+P$, where P has been estimated at the active speakers detection step. Details on the meaning of each component has been described earlier.

The optimal warp $w_t$ is obtained by solving $w_t = \text{argmin}_w (E_w)$.

Finally, the image $I_t$ is warpped using $w_t$ in order to abtain the resized image.

In another embodiment a seam carving-based video retargeting using the same preserving map P is used. However this may give less accurate results.

Video Arrangement 740

In another embodiment the previously described video conference retargeting method is applied for one, several, or all the video streams that are requested to be shown. Final steps then consist in arranging/packing the videos in a specific arrangement, for instance Side-by-Side (all videos in one line). The videos may be arranged in other ways as well.

Suppose the rendering unit 1775 needs to show N videos in this Side-by-Side format on a screen having a width $W_D$ and height $H_D$. The video arrangement system first estimated the target size $S_d^i = S_d$ for all the videos, for instance according to $$W_d = W_D/N \text{ and } H_d = H_D.$$

Then it performs the video conference retargeting algorithm previously described to all the videos according to the new target size $S_d$.

In a final step, it displays the N videos such that the top-left position $(X_d^i, Y_d^i)$ of the resized video i on the screen is:

$$X_d^i = {}^* W_d \text{ and } Y_d^i = 0.$$

Figure 5:
FIG. 5 illustrates schematically some aspects of the embodiments of the present invention where a video stream has been content-aware scaled and arranged, without face detection.
Figure 13B:
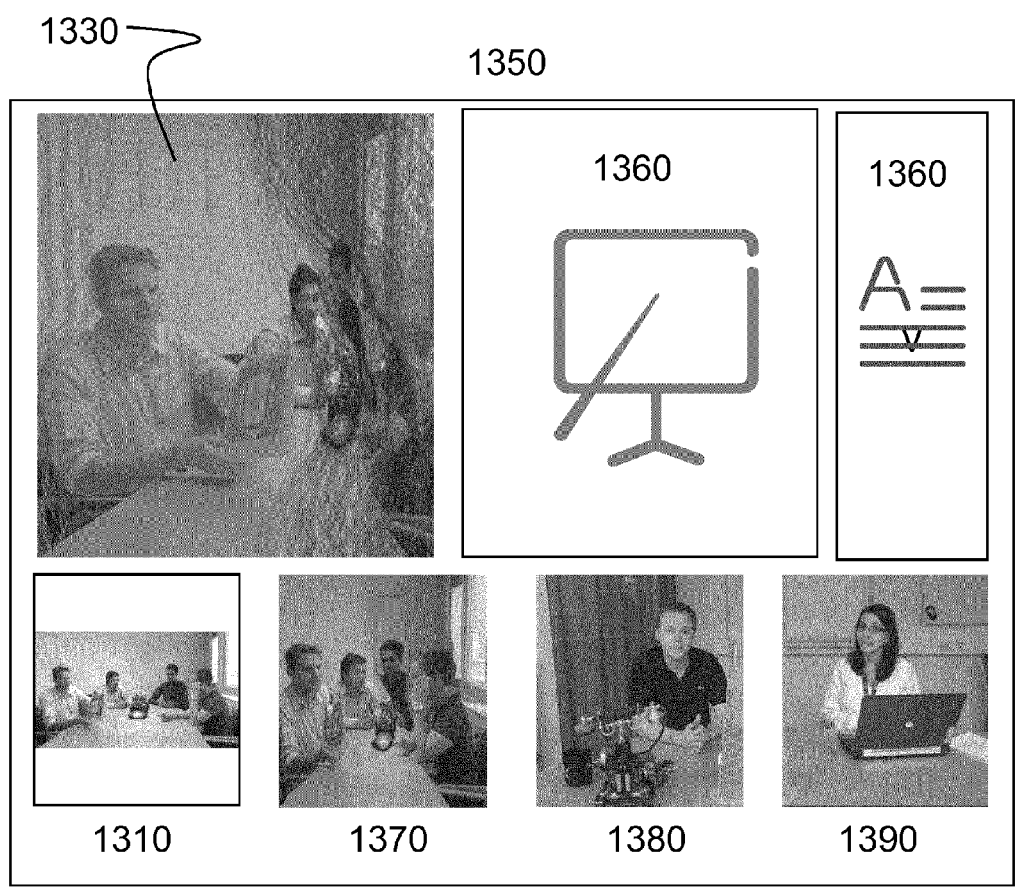
FIG. 13B illustrates some aspects of the embodiments of the present invention when used in a video mixing application.

An example of such an arrangement is depicted in FIG. 5 and FIG. 13B.

The method also works with different arrangements.

In another embodiment both the retargeted video 1330 and the original video 1310 is available, and may be displayed simultaneously 1350.

In embodiments, several alternative retargeted video streams are available and the viewer may select which video to watch. This may be combined with the possibility for the viewer to select which region(s) 1320 of the image to focus on, as described above and illustrated in FIG. 13A. In FIG. 13B an embodiment is schematically illustrated where the original video 1310 as well as one or several retargeted videos 1330, 1370 are arranged. The retargeted videos may use different retargeting methods and may be arranged together with video streams from other sources or participants 1380, 1390. In embodiments there may also be video streams with e.g. presentations such as films or slideshows 1360 available and/or collaboration tools like e.g. instant messaging (chat boards) or whiteboards 1360. Other combinations may be possible. In embodiments the videos may be rearranged and/or resized.

Database

Figure 14:
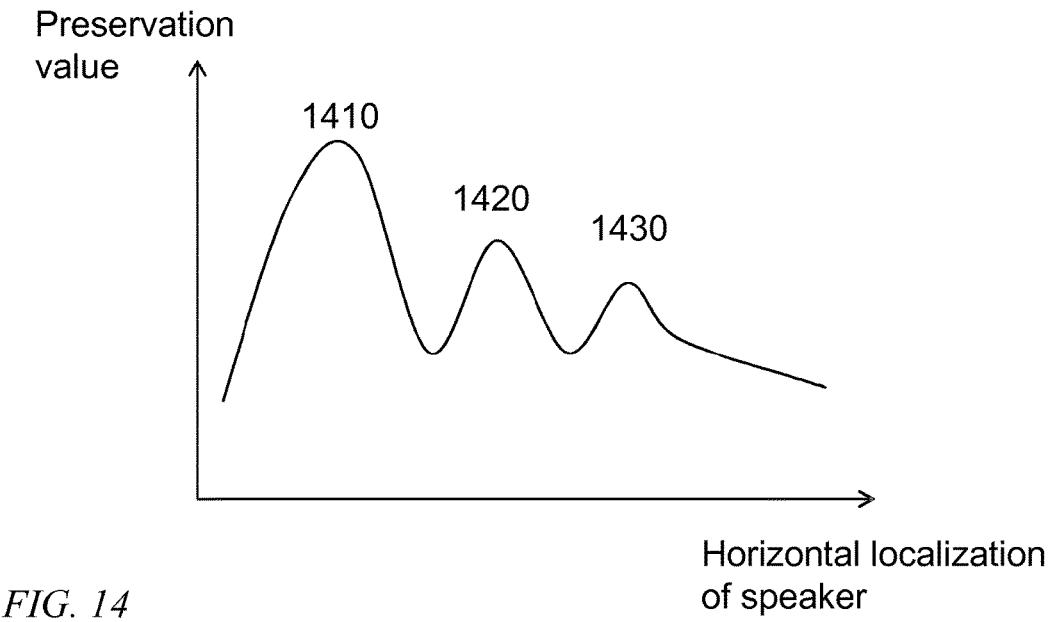
FIG. 14 illustrates according to some aspects of the embodiments of the present invention schematically the energy levels of the preserving map for speakers. The highest peak represents the present speaker.

Combining previously located speakers can be implemented in several ways. In FIG. 14 it is illustrated how different speakers 1410, 1420, 1430 located at different positions (horizontal position illustrated) are given different preserving values (i.e. weight). The values varies over time according to e.g. when or how much a speaker has talked. In embodiments all or a subset of the previously detected regions $R_s$ are stored in a database 1540, 1730 and associated with different weights and thus replace $W_{max}$ by $W_i$ in the previous equation constructing the preserving map, with for instance the weight of the speaker i could be: $W_i = W_{min} + i^* (W_{max} - W_{min})/M$ with M being the number of speakers. $W_{min}$ is the minimum weight.

In other embodiments information allowing to estimate $R_s$ for instance the speakers localizations (Xs, Ys, Zs, etc.) are stored and then $R_s$ is constructed.

In embodiments the previously estimated preserving maps $\{P_{t-1}, P_{t-2}, \ldots\}$ are stored and combined using the equation described in "Embodiments regularizing preserving map".

Another embodiment stores the previously estimated warp function(s) $W_{t-1}$ and use it in the energy constraint Ec.

Additional Notes

Embodiments introduce here a nonlinear deformation of the video, but the video retargeting algorithm is designed to place these nonlinear deformations in the less visible/noticeable areas of the video.

The speaker detection, and/or the construction for the preserving map, and/or the video conference retargeting and/or the video arrangement can be done anywhere in the video conference system, at the sending side if the target size is known/transmitted, at the reception side, or in a separated network module such as a MRFP, Media Resource Function Processor, or another central unit.

The output (resized video, arranged videos or not) can be display in the main display or in a second separated display.

The method can be implemented in real-time (per frame) but the method would also work if it is done regularly, for instance every N frames (e.g. N=20) or only when a new active speaker is detected. This is especially well suited in the video conference application where there the background is often static.

The preserving weighting coefficients $W_{max}$. and many other parameters shall be tweaked depending on the retargeting algorithm and its internal constraint weights, according to the characteristics desired by the user (such as temporal smoothing etc.), in order to reduce strong distortions such as the one appearing on the right part of the right image in FIG. 5.

Figure 15:
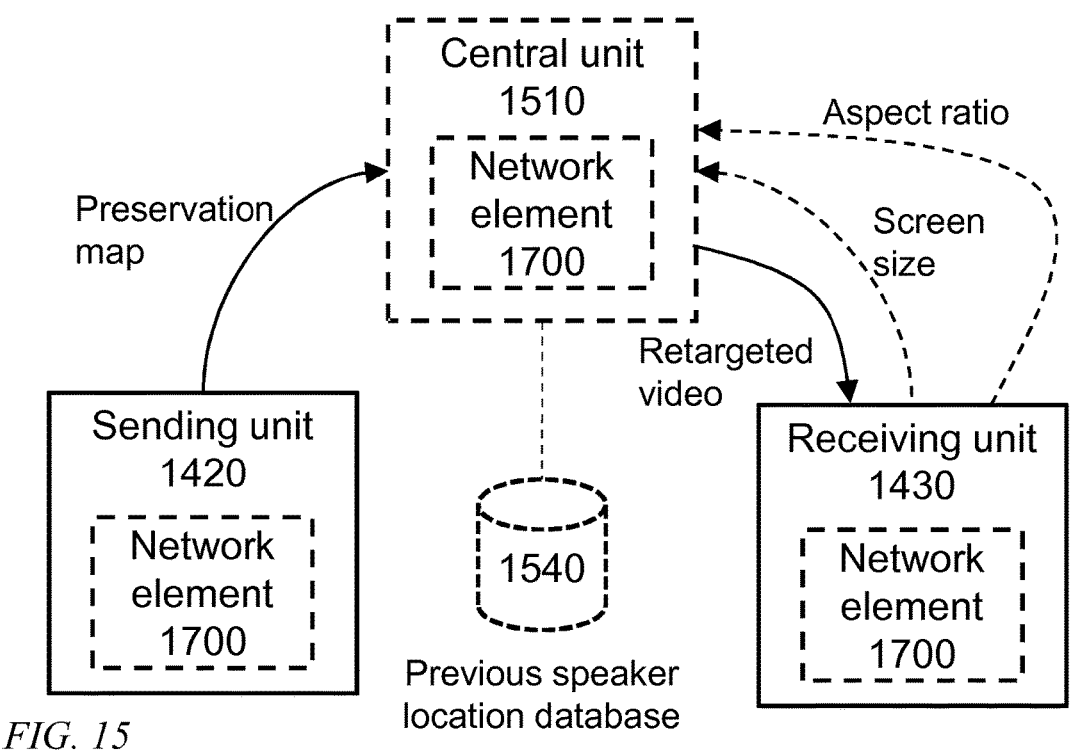
FIG. 15 illustrates schematically some aspects of the embodiments of the present invention.

FIG. 15 illustrates schematically an embodiment where the receiving unit 1530 is configured to send the wanted screen size, and may optionally also send the wanted aspect ratio. A network element 1700 is configured to then use the preservation mask created using any of the embodiments described earlier, and to send the retargeted video to a receiving unit 1530. As illustrated in the FIG. 15, steps in the method may be executed in either the sending unit 1520, the receiving unit 1530, or a central unit 1510. There may also be several sending and/or receiving units taking part in the video conference.

Figure 16A:
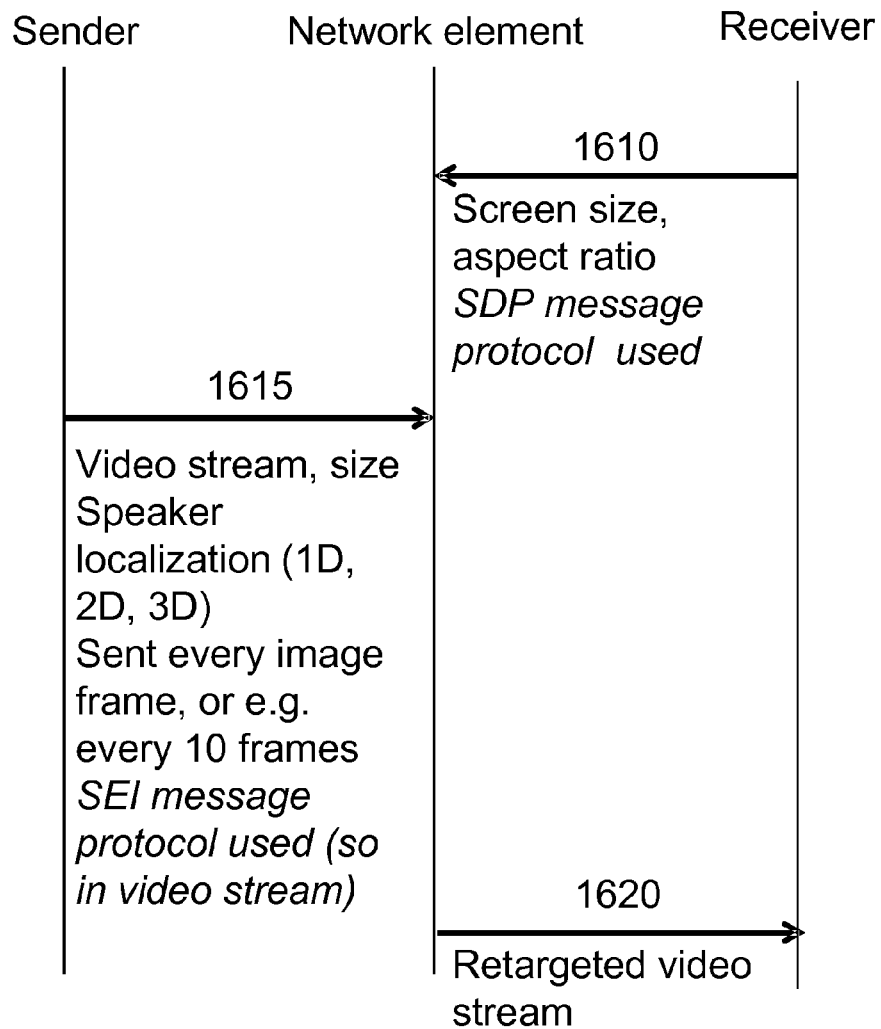
FIG. 16A-E are signaling schemes schematically illustrating some aspects of the embodiments of the present invention.

FIG. 16A illustrates schematically signaling in an embodiment where the Network element retrieves 1510 the screen size and/or the aspect ratio for the receiver, and from the sender retrieves 1515 the video stream, size and speaker localization, uses the information to compute the preserving map locally, retargets the video and send 1620 the new stream to the receiver. The information from the sender may be retrieved every image frame or in an interval, e.g. every 10 frames. SDP message protocol may be used to for the information from the receiver, and SEI message protocol for the information from the sender.

SEI: Supplemental enhancement information in video codecs (H264/AVC or H265/HEVC).

SDP: Session Description Protocol Session Description Protocol, SDP. SDP is intended for describing multimedia sessions for the purposes of session announcement, session invitation, and other forms of multimedia session initiation.

Figure 16B:
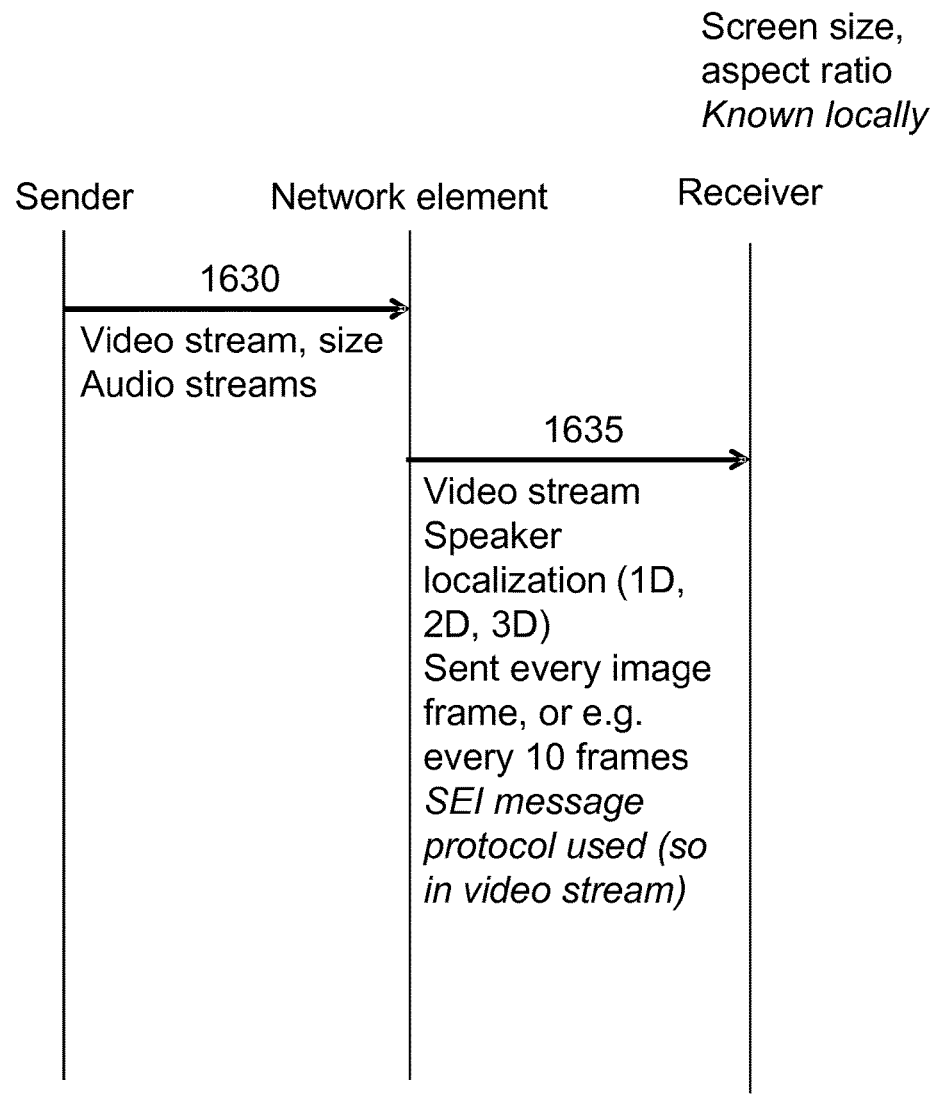

FIG. 16B illustrates schematically signaling in an embodiment where the Network element retrieves 1630 the video stream, size, and audio streams from the sender, performs the active speaker localization and sends 1635 it to the Receiver. The Receiver then performs preserving map estimation and video retargeting. The SEI message protocol may be used for the information to the receiver. The information to the receiver may be sent every image frame or in an interval, e.g. every 10 frames.

Figure 16C:
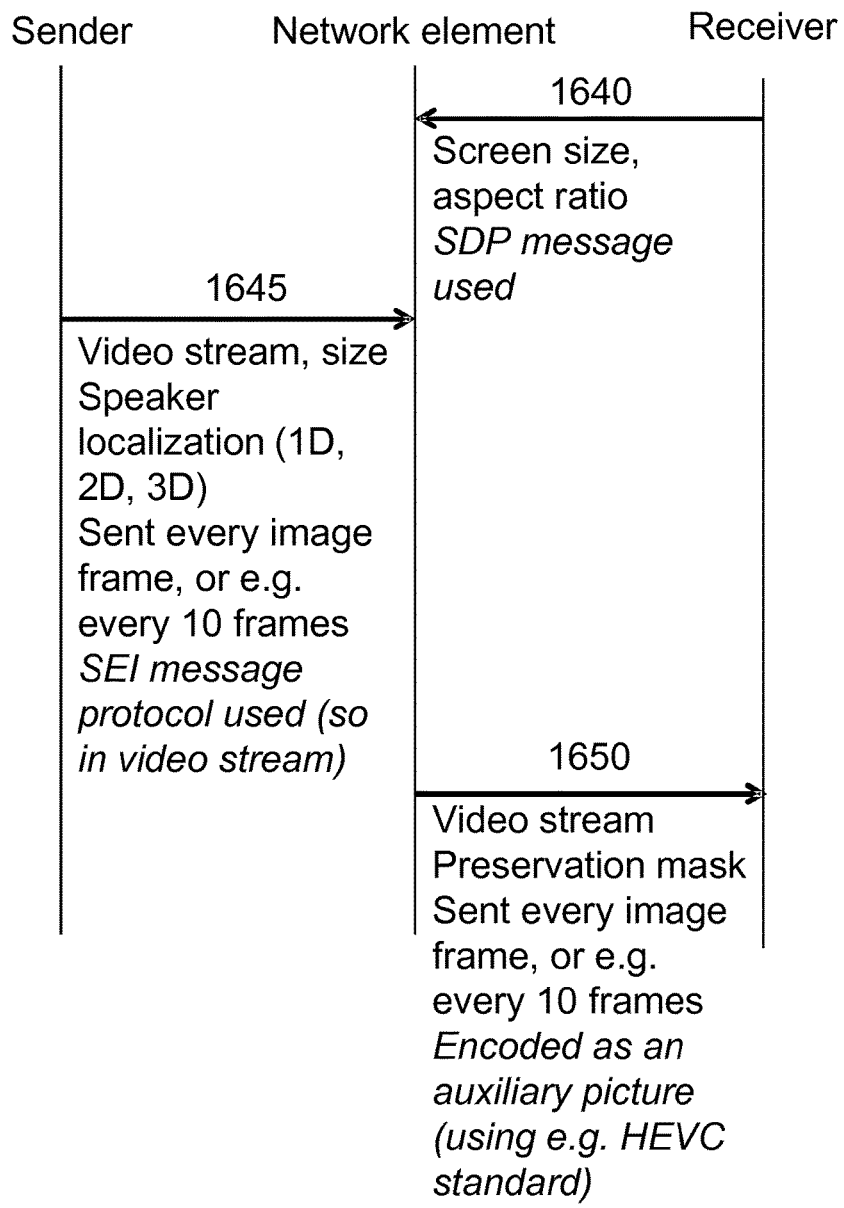

FIG. 16C illustrates schematically signaling in an embodiment where the Network element retrieves 1640 the screen size and/or the aspect ratio for the receiver, and from the sender retrieves 1645 the video stream, size and speaker localization, uses the information to perform the preserving map estimation and sends 1650 a video stream preservation mask to the receiver that performs the video retargeting. SDP message protocol may be used to for the information from the receiver, and SEI message protocol for the information from the sender. The video stream mask may be send every image frame or in an interval, e.g. every 10 frames. It may be encoded as an auxiliary picture and may be sent using e.g. HEVC standard.

Figure 16D:
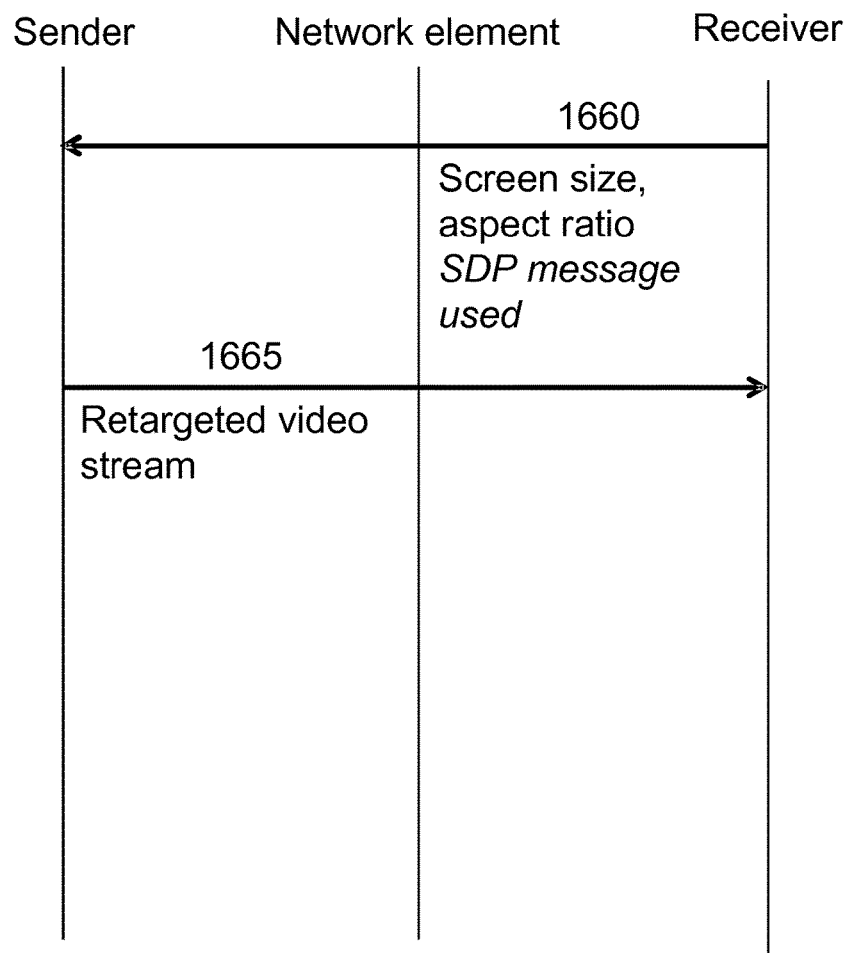

FIG. 16D illustrates schematically signaling in an embodiment where the sender retrieves 1660 screens size and/or aspect ratio, performs the preserving map estimation, video retargeting and directly sends 1665 the retargeted video. The information from the receiver may be sent using SDP message protocol.

Figure 16E:
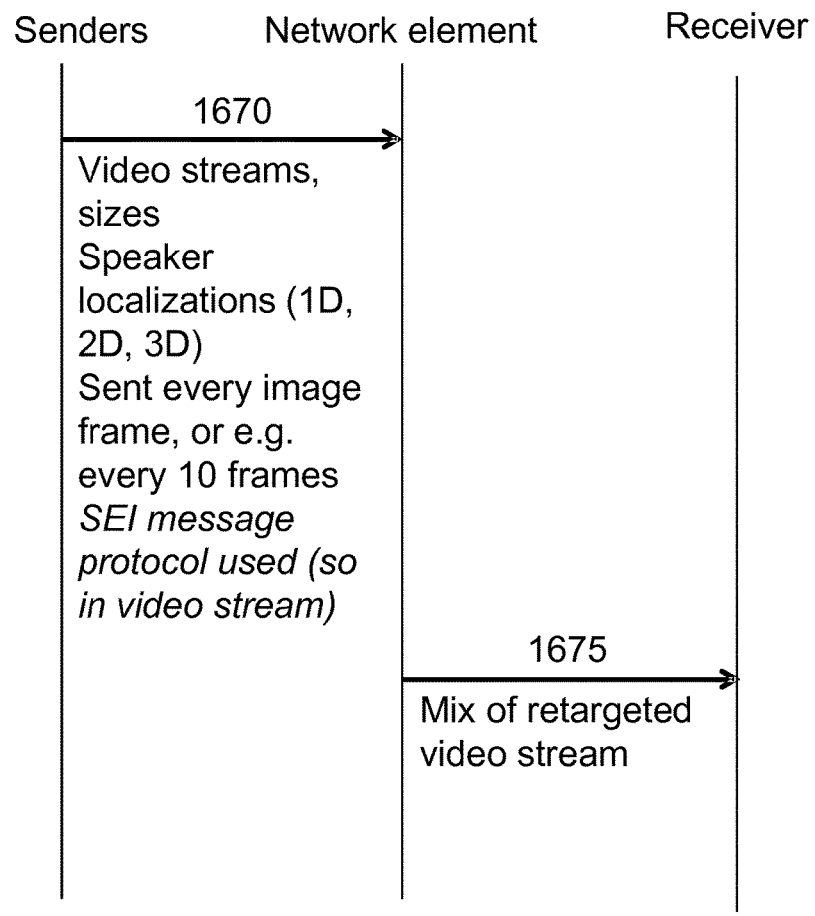

FIG. 16E illustrates schematically video mixing signaling in an embodiment where the Network element from the senders retrieves 1670 video streams, sizes, speaker localizations, then computes the preserving maps and retarget all the videos, then arrange them and sends 1675 only one video stream per receiver. Here the mixer is not aware about the receiver's screen size but uses the known retargeted video aspect ratio of the mixing. The information from the senders may be sent via SEI message protocol and may be send every image frame or in an interval, e.g. every 10 frames.

The network element with its including units could be implemented in hardware. There are numerous variants of circuitry elements that can be used and combined to achieve the functions of the units of the network element. Such variants are encompassed by the embodiments. Particular examples of hardware implementation of the network element are implementation in digital signal processor (DSP) hardware and integrated circuit technology, including both general-purpose electronic circuitry and application-specific circuitry.

Figure 17:
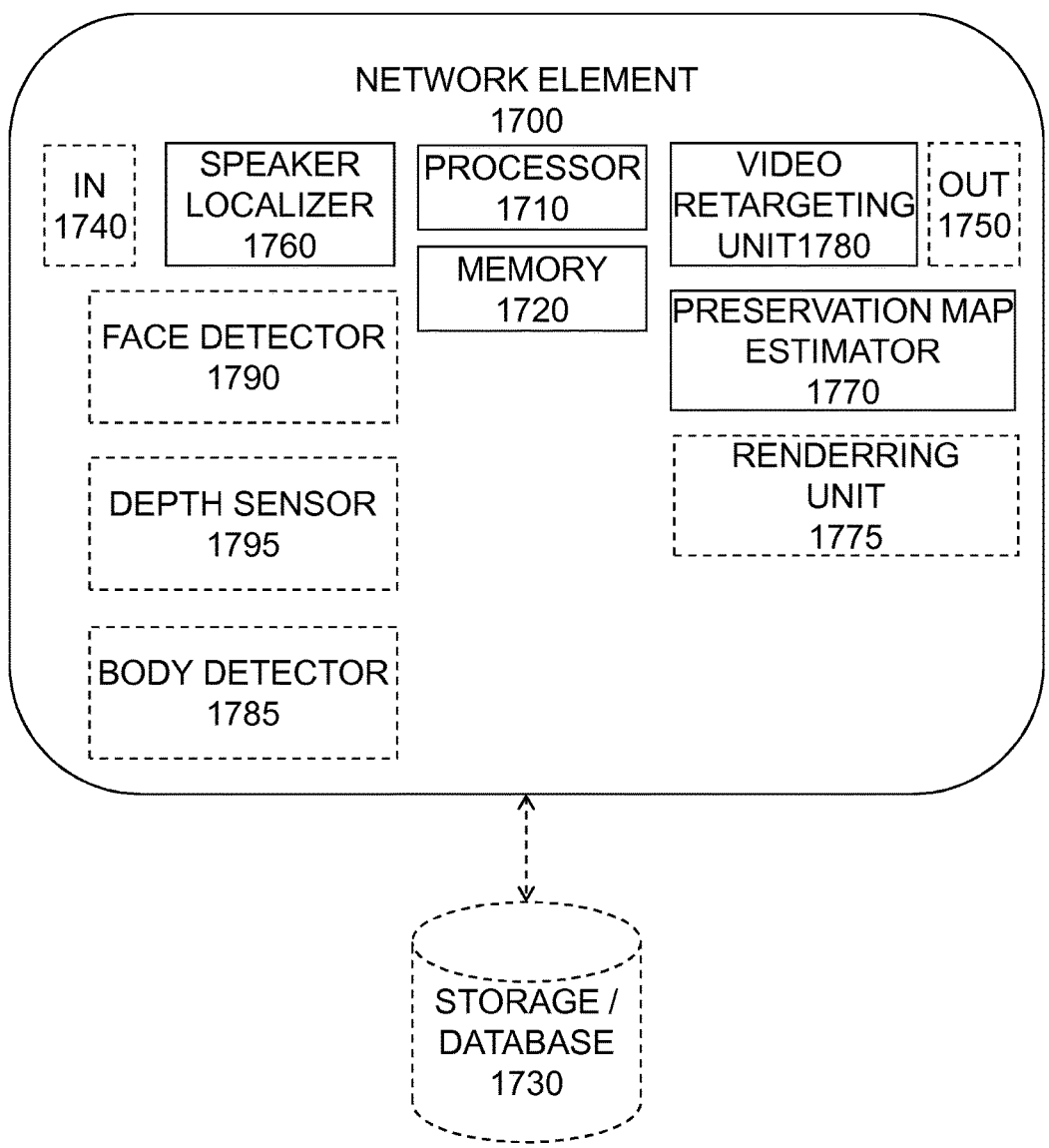
FIG. 17 illustrates schematically a network element according to some aspects of the embodiments of the present invention.

The network element described herein could alternatively be implemented e.g. by one or more of a processing unit and adequate software with suitable storage or memory therefore, a programmable logic device (PLD) or other electronic component(s) as shown in FIG. 17. In the FIG. 17 it is schematically illustrated that the network element 1700 may comprise a processor 1710, a memory 1720, a speaker localization unit 1760, a preserving map estimator 1770, and a video retargeting unit 1780. The network element may further comprise one or several of a face detector 1790, a depth sensor 1795, a body detector 1785, a rendering unit 1775, a input unit 1740 and an output unit 1750. The network element may comprise or be connected to a storage or database 1730.

According to embodiments parts of the above described network element may be combined, separate, situated in the sending unit, the receiving unit, or distributed in the network.

Figure 18:
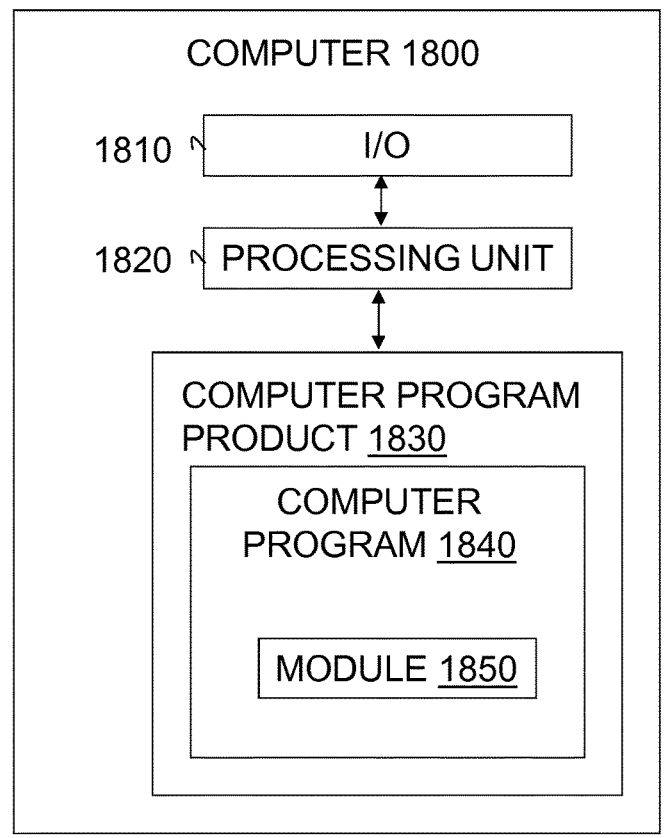
FIG. 18 illustrates schematically a computer according to a possible implementation of some of the aspects of the embodiments of the present invention.

FIG. 18 schematically illustrates an embodiment of a computer 1800 having a processing unit 1820, such as a DSP (Digital Signal Processor) or CPU (Central Processing Unit). The processing unit 1820 can be a single unit or a plurality of units for performing different steps of the method described herein. The computer 1800 also comprises an input/output (I/O) unit 1810 for receiving recorded or generated video frames or encoded video frames and outputting the retargeted video. The I/O unit 1810 has been illustrated as a single unit in FIG. 18 but can likewise be in the form of a separate input unit and a separate output unit.

Furthermore, the computer 1800 comprises at least one computer program product 1830 in the form of a non-volatile memory, for instance an EEPROM (Electrically Erasable Programmable Read-Only Memory), a flash memory or a disk drive. The computer program product 1830 comprises a computer program 1840, which comprises code means which when run on or executed by the computer, such as by the processing unit, causes the computer to perform the steps of the method described in the foregoing in connection with FIGS. 9-12. Hence, in an embodiment the code means in the computer program comprises a module 1850 configured to implement embodiments as disclosed herein or combinations thereof. This module 1850 essentially performs the steps of the flow diagram in FIG. 7 and steps of the signaling schemes in FIGS. 16A-E when run on the processing unit 1820. Thus, when the module 1850 is run on the processing unit 1820 it corresponds to the corresponding units of FIG. 17.

The embodiments may be implemented in software or hardware, combined or separate.

While the invention has been described with reference to specific exemplary embodiments, the description is in general only intended to illustrate the inventive concept and should not be taken as limiting the scope of the invention.

It will be understood by those skilled in the art that various modifications and changes may be made to the present invention without departure from the scope thereof, which is defined by the appended claims.

The invention claimed is:

1. A method for video conferencing to be performed by a network element, wherein sound localization is used to determine the at least one active speaker, the method comprises:
   using the active speaker location to determine image regions to preserve
   creating a preserving map with the areas of the image that should be preserved, and
   retargeting the video based on the preserving map, wherein the video retargeting is a nonlinear video retargeting method.

2. The method according to claim 1 wherein also face detection is used to determine image regions used to create the preserving map.

3. The method according to claim 1 wherein face detection is used to determine all participants used to create the preserving map.

4. The method according to claim 1, receiving via a user interface at least one region used to create the preserving map.

5. The method according to claim 1 wherein a database is used to keep track of detected persons.

6. The method according to claim 5 wherein most active speaker is given a higher preserving value.

7. The method according to claim 5 wherein most recent speaker is given a higher value.

8. The method according to claim 1, wherein a body detector is used to provide better people detection.

9. The method according to claim 1, wherein a depth sensor is used to provide better people detection.

10. The method according to claim 1, wherein aspect ratio adaption is used for retargeting the video to fit the receivers screen.

11. The method according to claim 1, wherein video mixing is used for arranging several videos coming from various senders into one video containing a mix of all or parts of the incoming videos to a receiver.

12. The method according to claim 1, wherein aspect ratio adaption and video mixing adaption is used for arranging several videos into one video that fits the receivers screen.

13. The method according to claim 1 wherein temporal smoothing is used if several people speak.

14. The method according to claim 1, wherein the retargeted video and the original video are available for the viewer to be displayed simultaneously.

15. The method according to claim 1, wherein the preserving map is constructed using a rectangle Rs (center =(xs, ys+dy), size =(ws, hs)) with values according to these equations:

$$ws = fx * W\text{body}/zs,$$

with Wbody=0.5 m, representing the mean chest width, $$hs = fy * H\text{trunk}/zs,$$

with Htrunk=0.6 m, representing the mean trunk height and $$dy = fy * Hc/zs,$$

with Hc=Htrunk/2−Hface/2 with Hface=0.25 m being the average head height, Hc represents a distance between the body half and the head mouth, dy is the same distance as Hc but converted to pixels, hs is the average trunk height expressed in pixel, zs is the speaker depth, fx is camera focal length on x-axis, and fy is camera focal length on y-axis.

16. The method according to claim 1, wherein the preserving map $$P(x,y) = W\max * \exp(-0.5 * ((x-xs)/\sigma(y))\,2)$$

is constructed using
σ(y)=σhead for all y<yhead+hs/4 and
σ(y)=σbody, otherwise
wherein
P(x,y) is the preservation map value at 2D position (x,y)
Wmax is a maximum weight value
σ(y) is the Gaussian standard deviation
σhead is a Gaussian standard deviation suited for the head
σbody is a Gaussian standard deviation suited for the body
xs is the located speaker position on x axis
hs is the average trunk height expressed in pixel
yhead is the speaker head y location.

17. The method according to claim 1, wherein the depth of people is derived from the relation $$zs = fx * W\text{face} / WFS$$

wherein
Wface is the mean face width, e.g. 15 cm
fx is the camera focal length on the x axis
zs the approximated depth
WFS the rectangle width given by the face detector.

18. The method according to claim 1, wherein the rectangle Rs is defined based on rectangle Fs using the equation $$Rs \text{ center}=(xFS, yFS+dy) \text{ and } Rs \text{ size}=(sx * WFS, sy * HFS),$$

wherein
xFS is the position of the center of the rectangle given by the fact detector on the x axis
yFS is the position of the center of the rectangle given by the fact detector on the y axis
dy, same as Hc but expressed in pixel
sx and sy are two scaling factors allowing to create a bigger rectangle based on the rectangle given by the face detector
WFS is the width of the rectangle given by the fact detector
HFS is the height of the rectangle given by the fact detector.

19. A network element for enabling video conferencing, wherein sound localization is used to determine the at least one active speaker, comprising a processor and memory, said memory containing instructions executable by said processor whereby said network element is operative to:
use the active speaker location to create a preserving map with areas of the image that should be preserved.
retarget the video based on said preserving map, wherein the network element uses a nonlinear video retargeting method.

20. The network element according to claim 19 further operative to detect faces in order to determine image regions used to create the preserving map.

21. The network element according to claim 19 further operative to receive requests from a viewer which regions of the video to display.

22. The network element according to claim 19 wherein a database is used to keep track of detected persons.

23. The network element according to claim 22 wherein most active speaker is given a higher preserving value.

24. The network element according to claim 22 wherein most recent speaker is given a higher value.

25. The network element to claim 19, wherein a body detector is used to provide better people detection.

26. The network element to claim 19, wherein a depth sensor is used to provide better people detection.

* * * * *